US008242994B2

(12) United States Patent
Nose et al.

(10) Patent No.: US 8,242,994 B2

(45) Date of Patent: Aug. 14, 2012

(54) DISPLAY DEVICE, CONTROLLER DRIVER AND DRIVING METHOD FOR DISPLAY PANEL

(75) Inventors: Takashi Nose, Kanagawa (JP); Hirobumi Furihata, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 333 days.

(21) Appl. No.: 12/588,729

(22) Filed: Oct. 26, 2009

(65) Prior Publication Data

US 2010/0066769 A1 Mar. 18, 2010

Related U.S. Application Data

(62) Division of application No. 11/439,959, filed on May 25, 2006, now Pat. No. 8,040,337.

(30) Foreign Application Priority Data

May 26, 2005 (JP) ................................. 2005-154284
May 18, 2006 (JP) ................................. 2006-138973

(51) Int. Cl.
*G09G 3/36* (2006.01)
*G06F 3/038* (2006.01)

(52) U.S. Cl. .......................................... 345/89; 345/204

(58) Field of Classification Search .................... 345/89, 345/204–207

See application file for complete search history.

(56) References Cited

U.S. PATENT DOCUMENTS

| | | | | |
|---|---|---|---|---|
| 6,072,476 | A * | 6/2000 | Harada et al. | 345/204 |
| 6,275,207 | B1 * | 8/2001 | Nitta et al. | 345/89 |
| 6,791,566 | B1 * | 9/2004 | Kuratomi et al. | 345/589 |
| 7,474,291 | B2 * | 1/2009 | Tyrrell et al. | 345/89 |
| 7,567,229 | B2 * | 7/2009 | Kasai et al. | 345/89 |
| 2002/0027551 | A1 * | 3/2002 | Nitta et al. | 345/204 |
| 2003/0020725 | A1 * | 1/2003 | Matsuda | 345/600 |
| 2005/0030254 | A1 * | 2/2005 | Jung et al. | 345/1.1 |
| 2005/0206636 | A1 * | 9/2005 | Kanai | 345/204 |

FOREIGN PATENT DOCUMENTS

| | | |
|---|---|---|
| JP | 06-161377 A | 6/1994 |
| JP | 7-56545 | 3/1995 |
| JP | 09-018806 A | 1/1997 |
| JP | 9-288468 | 11/1997 |
| JP | 11-041478 A | 2/1999 |

(Continued)

OTHER PUBLICATIONS

U.S. Office Action dated Feb. 1, 2010 in U.S. Appl. No. 11/439,959.

(Continued)

*Primary Examiner* — Amare Mengistu
*Assistant Examiner* — Aaron M Guertin
(74) *Attorney, Agent, or Firm* — McGinn IP Law Group, PLLC

(57) ABSTRACT

A display device includes a display panel, an environmental sensor, a correction circuit and a driving circuit. The correction circuit is configured to generate a corrected gray-scale data on the basis of input gray-scale data. The driving circuit is configured to drive the display panel in response to the corrected gray-scale data. The correction circuit generates the corrected gray-scale data by executing a correction using a polynomial in which the input gray-scale data are used as variables. Coefficients of the polynomial are changed in response to an output signal of the environmental sensor.

13 Claims, 14 Drawing Sheets

FOREIGN PATENT DOCUMENTS

| | | | |
|---|---|---|---|
| JP | 2000-184236 | | 6/2000 |
| JP | 2001-103504 | | 4/2001 |
| JP | 2001-169303 | A | 6/2001 |
| JP | 2001-238227 | | 8/2001 |
| JP | 2003-208142 | A | 7/2003 |
| JP | 2003-280598 | A | 10/2003 |
| JP | 2004-212598 | | 7/2004 |

OTHER PUBLICATIONS

Japanese Office Action dated Sep. 16, 2011 with an English translation.

Japanese Office Action dated Dec. 7, 2011, with partial English translation.

* cited by examiner

Fig. 7 j="R", "G", or "B"

| OUTPUT SIGNAL OF EXTERNAL LIGHT SENSOR | BRIGHTNESS SELECTING SIGNAL (BRIGHTNESS OF BACK LIGHT) | GRAY-SCALE SELECTING SIGNAL ($\gamma$ driver) | CORRECTION POINT SELECTING SIGNAL ($\gamma_{logic}$ j) | $\gamma$display j |
|---|---|---|---|---|
| DARK | LOW BRIGHTNESS | 1.0 | 1.0 | 1.0 |
| | | 1.0 | 1.2 | 1.2 |
| | | 1.0 | 1.4 | 1.4 |
| | | 1.6 | 1.0 | 1.6 |
| | | 1.6 | 1.125 | 1.8 |
| | | 2.0 | 1.0 | 2.0 |
| | | 2.0 | 1.1 | 2.2 |
| | | 2.0 | 1.2 | 2.4 |
| | | 2.0 | 1.3 | 2.6 |
| LIGHT | HIGH BRIGHTNESS | 2.8 | 1.0 | 2.8 |

DISPLAY DEVICE, CONTROLLER DRIVER AND DRIVING METHOD FOR DISPLAY PANEL

The present Application is a Divisional Application of U.S. patent application Ser. No. 11/439,959, filed on May 25, 2006 now U.S. Pat. No. 8,040,337.

BACKGROUND OF THE INVENTION

1. Field of the Invention

The present invention relates to a display device and a driving method for a display panel, and more particularly a method to adjust a gray-scale level displayed on the display panel as desired by performing a correction to a gray-scale data.

2. Description of the Related Art

In a liquid crystal display, a gamma correction is performed in accordance with voltage-transmission characteristics (V-T characteristics) of a liquid crystal panel to correct a corresponding relationship between a gray-scale data supplied from an outside and a driving signal for driving a display device. Since the V-T characteristics are nonlinear, a nonlinear driving voltage needs to be generated by a gamma correction with respect to a value of gray-scale data in order to display an original image in a correct color tone. Moreover, a gamma correction is performed by occasionally using different gamma values for R (red), G (green) and B (blue) respectively in order to improve the color tone of a display image. Since each of R (red), G (green) and B (blue) has different voltage-transmission characteristics of the liquid crystal panel, it is preferable to perform the gamma correction by using a gamma value corresponding to the color for the improvement of the color tone of the display image.

There are roughly two methods to realize the gamma correction in the liquid crystal panel. One method (hereinafter referred to as the first method) controls a gray-scale voltage corresponding to each of usable gray-scales to a voltage level corresponding to a gamma curve. The driving voltage of the liquid crystal panel is generated by generally selecting a gray-scale voltage corresponding to a gray-scale data from a plurality of gray-scale voltages. Accordingly, a gamma correction is realized by controlling the voltage level of each gray-scale voltage to meet with the gamma curve.

The other method (hereinafter referred to as the second method) executes a data processing for gray-scale data. In the gamma correction, the data processing is executed in accordance with the following formula with respect to input gray-scale data $D_{IN}$ so as to generate corrected gray-scale data $D\gamma$.

$$D\gamma = D\gamma^{MAX}(D_{IN}/D_{IN}^{MAX})^{\gamma}, \tag{1}$$

A driving voltage for driving a signal line is generated in accordance with the corrected gray-scale data $D\gamma$ that was generated beforehand.

There are positive and negative aspects in the first and second methods. In the first method, since a gray-scale voltage applied to the liquid crystal panel is adjusted in consideration with the V-T characteristics of the liquid crystal panel, a precise correction can be realized for various gamma curves. However, it is difficult for the first method to adjust a gray-scale voltage, and it is not suitable to perform a gamma correction with different gamma values in R (red), G (green) and B (blue) respectively. It is because the gray-scale voltage provided in the inside of a driver IC which drives a signal line of the liquid crystal panel is shared among R (red), G (green) and B (blue); and if it is assumed to change the gray-scale voltages respectively for R (red), G (green) and B (blue), signal lines for supplying a gray-scale voltage need to be provided separately in each of R (red), G (green) and B (blue). Meanwhile, it is suitable for the second method to perform a gamma correction with different gamma values for R (red), G (green) and B (blue) respectively. However, in the second method, a circuit size tends to be large.

It is especially problematic in the second method that an arithmetic operation including exponentiation is involved in the formula (1). A circuit for rigorously executing the arithmetic operation of exponentiation is complicated and has a problem of being mounted to a liquid crystal driver. If a device has an excellent arithmetic operation capability such as CPU (Central Processing Unit), the arithmetic operation of exponentiation can be rigorously executed by a combination of a logarithmic operation, multiplication and exponential operation. For example, Japanese Laid-Open Patent Application JP-P2001-103504A discloses a mounting method of a gamma correction which is realized by a combination of a logarithmic operation, multiplication and exponential operation. However, it is not preferable to mount a circuit for rigorously executing exponentiation in terms of reducing a hard ware.

One of the simple mounting methods for the gamma correction is to use a look-up table (LUT) in which the corresponding relationship between the input gray-scale data and the corrected gray-scale data is written. The gamma correction can be realized without directly executing exponentiation by defining the corresponding relationship between the input gray-scale data and the corrected gray-scale data written in the LUT in accordance with the formula (1). Japanese Laid-Open Patent Application JP-P2001-238227A and JP-A-Heisei 07-056545 disclose a technique to prepare the LUTs for R (red), G (green) and B (blue) respectively in order to perform the gamma correction corresponding to gamma values which are different in the respective colors.

One of the problems to perform the gamma correction by using the LUT is that the size (or the number) of the LUT needs to be increased to perform the gamma correction corresponding to the different gamma values. For example, in order to perform the gamma correction for each of R, G and B and for 256 kinds of the gamma values by using the LUT with the 6-bit input gray-scale data and the 8-bit corrected gray-scale data, the LUT needs to have 393216 (=64×8×3×256) bits. It is problematic on mounting the gamma correction to the liquid crystal driver.

Japanese Laid-Open Patent Application JP-A-Heisei 09-288468 discloses a technique to perform the gamma correction corresponding to a plurality of the gamma values while sustaining the LUT size small. In this technique, a liquid crystal display device is provided with the rewritable LUT. Data to be stored in the LUT are calculated by a CPU using arithmetic operation data stored in an EEPROM, and then transmitted from the CPU to the LUT. Japanese Laid-Open Patent Application JP-P2004-212598A also discloses a similar technique. According to the technique described there, the LUT data is generated by a brightness distribution determination circuit and transmitted to the LUT.

Japanese Laid-Open Patent Application JP-P2000-184236A discloses a technique to suppress the increase of the circuit size by using the LUT, in which the corresponding relationship between the input gray-scale data and the corrected gray-scale data is written, for calculating polygonal line approximation parameters instead of directly using for generating the corrected gray-scale data. In this technique, the corrected gray-scale data corresponding to specific gray-scale data are calculated by using the LUT so as to calculate polygonal line graph information including the polygonal line approximation parameters by using the corrected gray-scale data calculated above. When the input gray-scale data is provided, the corrected gray-scale data are calculated by the polygonal line approximation indicated in the polygonal line graph information.

However, in the conventional technique, it is impossible to instantly switch gamma curves (i.e. an instant switch of gamma values for a gamma correction) in accordance with the changes of a surrounding environment of a liquid crystal display. Since portable terminals such as a laptop PC, PDA (Personal Data Assistant) and a mobile phone can be used under various environments, there is a demand to change the visibility of the liquid crystal panel to correspond to the environmental changes. For example, in a liquid crystal display using a semi-transmission liquid crystal, a reflection mode is used to display images when the intensity of the external light is strong, and a transmission mode is used to display images when the intensity of the external light is weak. Since the reflection mode and the transmission mode have different gamma values in the liquid crystal panel, the visual performance of the liquid crystal highly depends on the intensity of the external light. Therefore, if it is possible to instantly switch the gamma values by corresponding to the intensity of the external light, the visibility of the liquid crystal display can be significantly enhanced. However, conventional techniques are unable to satisfy these demands. For example, in a technique described in Japanese Laid-Open Patent Application JP-A-Heisei 09-288468 and Japanese Laid-Open Patent Application JP-P2004-212598A, data to be stored in the LUT needs to be transmitted to the LUT and the LUT needs to be rewritten so as to switch the gamma values for the gamma correction. Because of a considerable size of the data stored in the LUT, it is still difficult to instantly switch the LUT. It means that the gamma values are difficult to be switched instantly for the gamma correction.

Based on these situations, it is now demanded to provide a technique which can instantly switch the correction curves (e.g. gamma curves for performing the gamma correction) in a short period of time in accordance with the change of a surrounding environment in a display device, while a circuit size is kept to be small.

SUMMARY OF THE INVENTION

In order to achieve an aspect of the present invention, the present invention provides a display device including: a display panel; an environmental sensor; a correction circuit configured to generate a corrected gray-scale data on the basis of input gray-scale data; and a driving circuit configured to drive said display panel in response to said corrected gray-scale data, wherein said correction circuit generate said corrected gray-scale data by executing a correction using a polynomial in which said input gray-scale data are used as variables, and wherein coefficients of said polynomial are changed in response to an output signal of said environmental sensor.

In the present invention, since the exponential operation is eliminated by using polynomials for the correction operation, a size of a circuit can be minimized. It is necessary to provide neither a complex operation circuit nor an LUT for executing the exponential operation. In addition, since it is not necessary to transmit large size data for switching coefficients of the polynomials, a correction curve can be easily switched in a short period of time based on a change of surrounding environment.

BRIEF DESCRIPTION OF THE DRAWINGS

The above and other objects, advantages and features of the present invention will be more apparent from the following description taken in conjunction with the accompanying drawings, in which:

FIG. 7 is a chart exemplifying a gamma correction performed in the third embodiment;

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Embodiments of a display device and a driving method for a display panel according to the present invention will be described below with reference to the attached drawings.

First Embodiment

Figure 1:
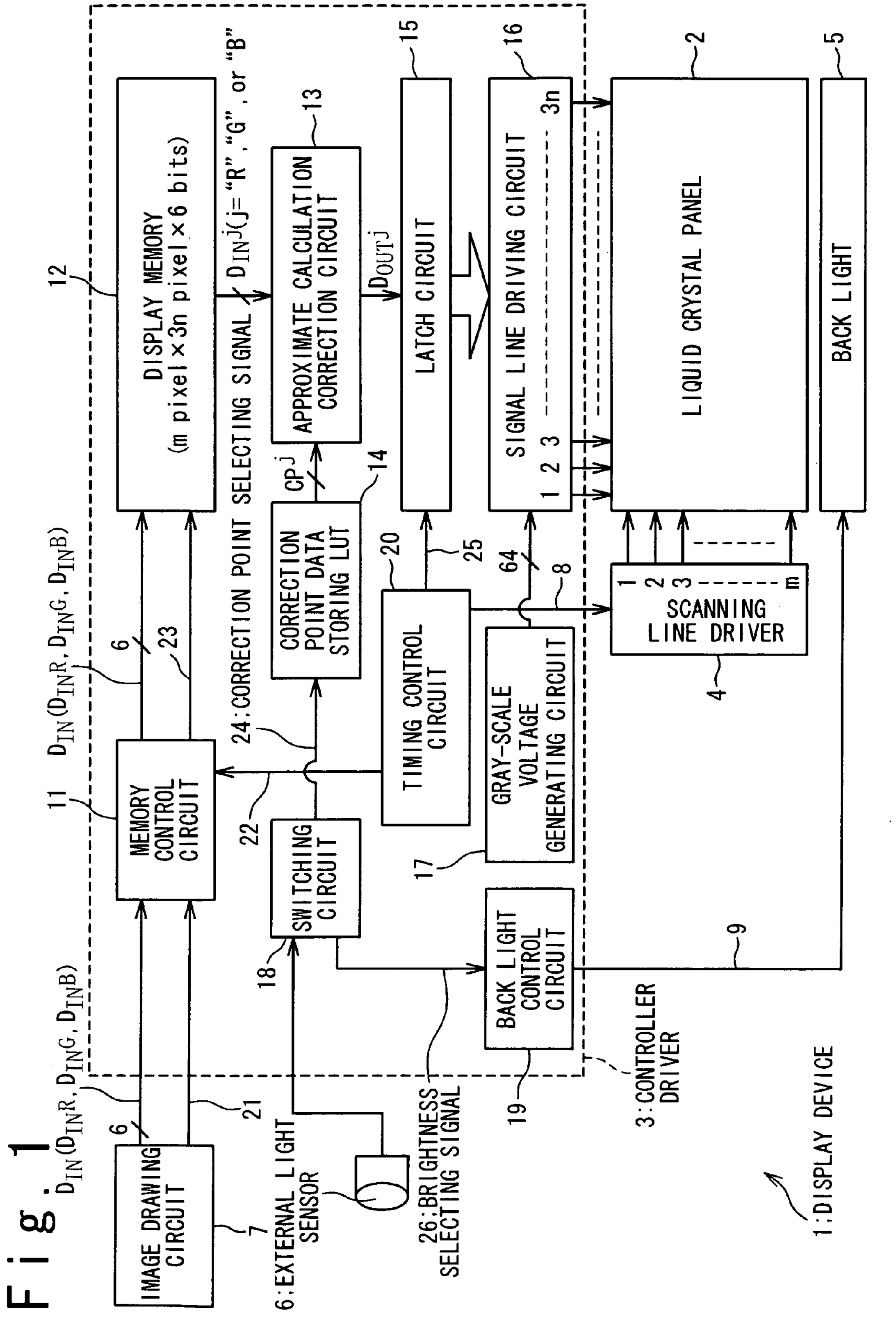
FIG. 1 is a block diagram showing a configuration of a display device according to a first embodiment of the present invention.

FIG. 1 is a block diagram showing a configuration of a display device 1 according to a first embodiment of the present invention. The display device 1 includes a liquid crystal panel 2, a controller driver 3, a scanning line driver 4, a back light 5 and an external light sensor 6.

The liquid crystal panel 2 includes m number of scanning lines (gate lines), 3n number of signal lines (source lines) and m number of rows by 3n number of columns of pixels positioned at cross points of the scanning lines and signal lines. Here, "m" and "n" are natural numbers.

The controller driver 3 receives input gray-scale data $D_{IN}$ from an image drawing circuit 7 exemplified by a CPU or DSP (Digital Signal Processor), and drives the signal lines (source lines) of the liquid crystal panel 2 in response to the input gray-scale data $D_{IN}$. In this embodiment, the input gray-scale data $D_{IN}$ are 6-bit data. The input gray-scale data $D_{IN}$ corresponding to R (red) pixels of the liquid crystal panel 2 are also indicated as R data $D_{IN}^{R}$. Similarly, the input gray-scale data $D_{IN}$ corresponding to G (green) and B (blue) pixels are also indicated as G data $D_{IN}^{G}$ and B data $D_{IN}^{B}$, respectively. The controller driver 3 further has functions for generating a scanning line driver control signal 8 and a back light control signal 9 to control the scanning line driver 4 and the back light 5.

The scanning line driver 4 drives the scanning lines (gate lines) of the liquid crystal panel 2 in response to the scanning line driver control signal 8.

The back light 5 emits white color light from a back side of the liquid crystal panel 2. The external light sensor 6 measures the intensity of external light in the environment to dispose the display device 1.

The external light sensor 6 generates an output signal corresponding to the intensity of the external light, and supplies it to the controller driver 3. The output signal of the external light sensor 6 is supplied to the controller drier 3, and used to control the back light 5 and the gamma correction performed in the controller driver 3.

The controller driver 3 includes a memory control circuit 11, a display memory 12, an approximate calculation correction circuit 13, a correction point data storing LUT 14, a latch circuit 15, a signal line driving circuit 16, a gray-scale voltage generating circuit 17, a switching circuit 18, a back light control circuit 19 and a timing control circuit 20.

The memory control circuit 11 has a function for controlling the display memory 12 to write the input gray-scale data $D_{IN}$ sent from the image drawing circuit 7 into the display memory 12. To be more specific, the memory control circuit 11 generates a memory control signal 23 to control the display memory 12 in response to a control signal 21 sent from the image drawing circuit 7 and a timing control signal 22 sent from the timing control circuit 20. Moreover, the memory control circuit 11 transfers the input gray-scale data $D_{IN}$ sent from the image drawing circuit 7 to the display memory 12 in synchronization with the memory control signal 23, and writes the input gray-scale data $D_{IN}$ in the display memory 12.

The display memory 12 is aimed to temporarily store the input gray-scale data $D_{IN}$ sent from the image drawing circuit 7 in the controller driver 3. The display memory 12 has the capacity of one flame or specifically the capacity of m×3n×6 bits. The display memory 12 outputs the stored input gray-scale data $D_{IN}$ in turn in response to the memory control signal 23 sent from the memory control circuit 11. The input gray-scale data $D_{IN}$ are outputted for each one-line pixel of the liquid crystal panel 2.

The approximate calculation correction circuit 13 is aimed to perform the gamma correction with respect to the input gray-scale data $D_{IN}$ sent from the display memory 12. The approximate calculation correction circuit 13 performs an approximated gamma correction by a data processing for the input gray-scale data $D_{IN}$ and generates output gray-scale data $D_{OUT}$. The output gray-scale data $D_{OUT}$ are 6-bit data in the same manner with the input gray-scale data $D_{IN}$. In the following description, the output gray-scale data $D_{OUT}$ corresponding to R (red) pixels are also indicated as output R data $D_{OUT}^{R}$. Similarly, the output gray-scale data $D_{OUT}$ corresponding to G (green) and B (blue) pixels are also indicated as output G data $D_{OUT}^{G}$ and output B data $D_{OUT}^{B}$, respectively.

The gamma correction by the approximate calculation correction circuit 13 employs an approximation formula, which is a quadratic polynomial. As described in details below, employing the approximation formula with a quadratic polynomial is important to eliminate the necessity of the arithmetic operation of exponential and a table look-up operation for the gamma correction, and to minimize the size of a circuit required for the gamma correction.

The correction point data storing LUT 14 has a function for specifying the coefficient of the approximation formula used for the gamma correction by the approximate calculation correction circuit 13. Specifically, the correction point data storing LUT 14 stores a plurality of correction point data, selects a correction point data based on a correction point selecting signal 24 sent from the switching circuit 18, and sends the selected correction point data to the approximate calculation correction circuit 13. The correction point data is a value to determine the curve form of the approximation formula used in the gamma correction, and the coefficient of the approximation formula is determined by this correction point data. Since the gamma values of the liquid crystal panel 2 are different in the respective colors (i.e. different in R, G and B), different correction point data are selected for R, G and B in general. In the following description, the correction point data corresponding to R, G and B are indicated as R correction point data $CP^{R}$, G correction point data $CP^{G}$ and B correction point data $CP^{B}$, respectively.

The latch circuit 15 latches the output gray-scale data $D_{OUT}$ from the approximate calculation correction circuit 13 in response to a latch signal 25, and transfers the latched output gray-scale data $D_{OUT}$ to the signal line driving circuit 16.

The signal line driving circuit 16 drives the signal lines of the liquid crystal panel 2 in response to the output gray-scale data $D_{OUT}$ sent from the latch circuit 15. Specifically, the signal line driving circuit 16 selects a corresponding gray-scale voltage among a plurality of gray-scale voltages supplied from the gray-scale voltage generating circuit 17 in response to the output gray-scale data $D_{OUT}$ so as to drive a corresponding signal line of the liquid crystal panel 2 in the selected gray-scale voltage. In this embodiment, the number of the plurality of the gray-scale voltages supplied from the gray-scale voltage generating circuit 17 is 64.

The switching circuit 18, the back light control circuit 19 and the timing control circuit 20 have a role to entirely control the display device 1. Specifically, the switching circuit 18 generates the correction point selecting signal 24 in response to an output from the external light sensor 6, and supplies to the correction point data storing LUT 14. The switching circuit 18 further generates a brightness selecting signal 26 in response to the output from the external light sensor 6, and supplies to the back light control circuit 19. The back light control circuit 19 controls the back light 5 in response to the brightness selecting signal 26. The brightness of the back light 5 is controlled based on the intensity of the external light received by the external light sensor 6. The curve form of the approximation formula used in the gamma correction is controlled for the high visibility of the display image shown on the liquid crystal panel 2 in the brightness of the back light 5.

The timing control circuit 20 generates the scanning line driver control signal 8, the timing control signal 22 and the latch signal 25 to supply the scanning line driver 4, the memory control circuit 11 and the latch circuit 15, respectively. The timing control of the display device 1 is executed by the scanning line driver control signal 8, the timing control signal 22 and the latch signal 25.

Further details of the approximate calculation correction circuit 13 and the correction point data storing LUT 14 will be explained below.

Figure 2:
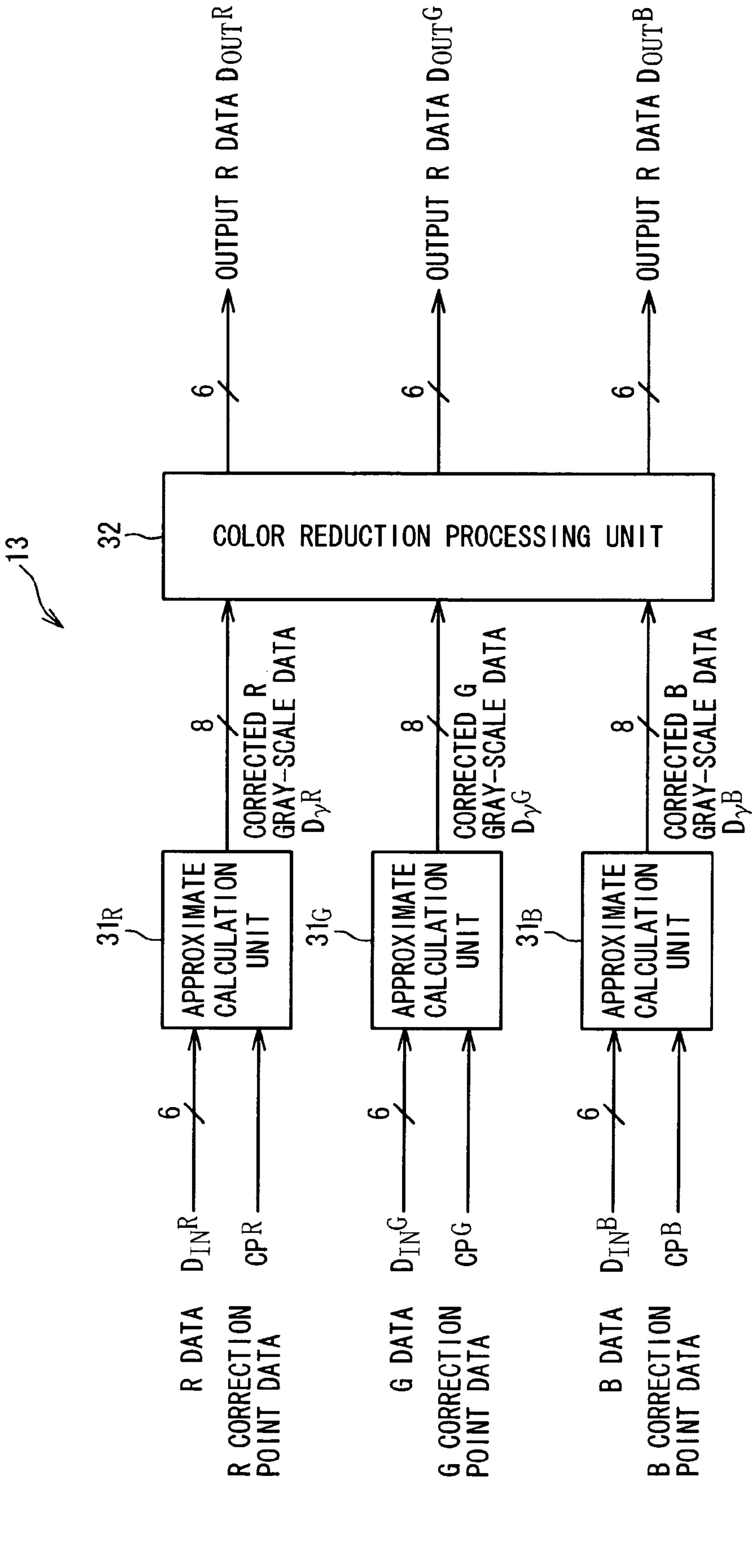
FIG. 2 is a block diagram showing a configuration of an approximate calculation correction circuit of the display device according to the first embodiment.

FIG. 2 is a block diagram showing a configuration of the approximate calculation correction circuit 13 to perform the gamma correction. The approximate calculation correction circuit 13 includes approximate calculation units $\mathbf{31}_R$, $\mathbf{31}_G$ and $\mathbf{31}_B$ prepared for R, G and B, respectively, and a color reduction processing unit 32.

The approximate calculation units $\mathbf{31}_R$, $\mathbf{31}_G$ and $\mathbf{31}_B$ performs the gamma corrections for the R data $D_{IN}^R$, G data $D_{IN}^G$ and B data $D_{IN}^B$, respectively by the approximation formula, and generates corrected R gray-scale data $D\gamma^R$, corrected G gray-scale data $D\gamma^G$ and corrected B gray-scale data $D\gamma^B$. The bit number of the corrected R gray-scale data $D\gamma^R$, the corrected G gray-scale data $D\gamma^G$ and the corrected B gray-scale data $D\gamma^B$ is larger than that of the R data $D_{IN}^R$, G data $D_{IN}^G$ and B data $D_{IN}^B$. It is in order to avoid losing the pixel gray-scale by the gamma correction. In this embodiment, the R data $D_{IN}^R$, G data $D_{IN}^G$ and B data $D_{IN}^B$ are 6-bit data, and the corrected R gray-scale data $D\gamma^R$, the corrected G gray-scale data $D\gamma^G$ and the corrected B gray-scale data $D\gamma^B$ are 8-bit data.

The color reduction processing unit 32 executes a color reduction processing for the corrected R gray-scale data $D\gamma^R$, the corrected G gray-scale data $D\gamma^G$ and the corrected B gray-scale data $D\gamma^B$, respectively, and generates the output R data $D_{OUT}^R$, the output G data $D_{OUT}^G$ and the output B data $D_{OUT}^B$. The output R data $D_{OUT}^R$, output G data $D_{OUT}^G$ and output B data $D_{OUT}^B$ are 6-bit data. The generated output R data $D_{OUT}^R$, the output G data $D_{OUT}^G$ and the output B data $D_{OUT}^B$ are finally used for driving the signal lines of the liquid crystal panel 2.

The gamma correction by the approximate calculation units $\mathbf{31}_R$, $\mathbf{31}_G$ and $\mathbf{31}_B$ is performed by the arithmetic operation using the following approximation formula (a formula (3)):

$$D\gamma^j = \frac{D\gamma^{MIN}(D_{IN}^{MAX} - D_{IN}^j)^2 + 2CP^j(D_{IN}^{MAX} - D_{IN}^j)(D_{IN}^j - D_{IN}^{MIN})}{(D_{IN}^{MAX})^2} + D\gamma^{MAX}(D_{IN}^j - D_{IN}^{MIN})^2, \quad (3)$$

In the above formula (3), j is an arbitrary symbol selected from R, G and B, and $CP_j$ is correction point data supplied form the correction point data storing LUT 14. $D\gamma^{MIN}$ is a minimum value of the corrected R gray-scale data $D\gamma^R$, the corrected G gray-scale data $D\gamma^G$ and the corrected B gray-scale data $D\gamma^B$, and $D\gamma^{MAX}$ is a maximum value of these data. $D_{IN}^{MIN}$ and $D_{IN}^{MAX}$ are a minimum value and a maximum value of the input gray-scale data $D_{IN}^j$.

It should be noted that the formula (3) is a quadratic polynomial with regard to the $D_{IN}^{j'}$. Using the approximation formula of the polynomial for the gamma correction eliminates necessity of the arithmetic operation of exponential and the table look-up operation for the gamma correction, and is effective to minimize the size of a circuit required for the gamma correction.

Figure 3:
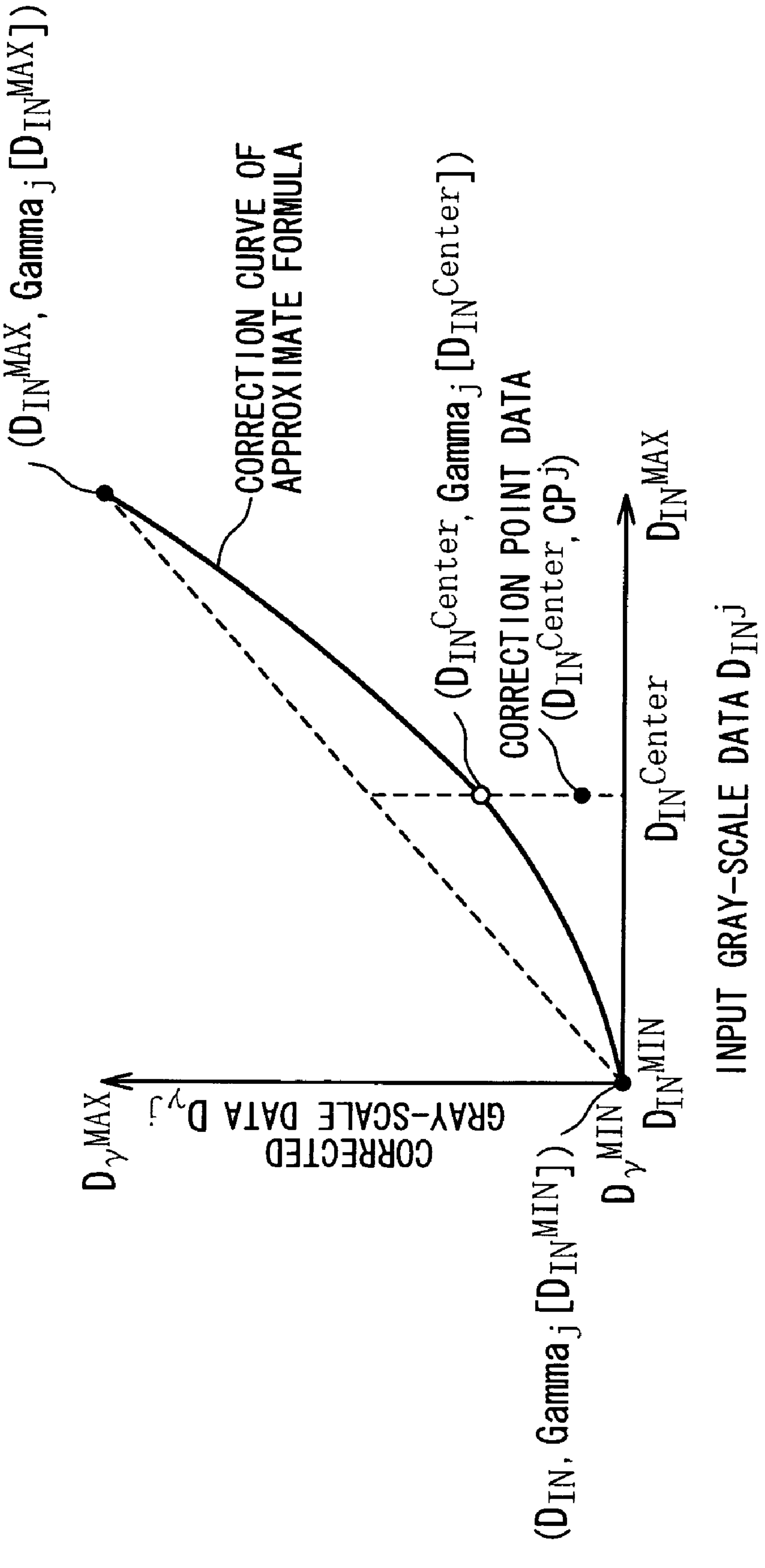
FIG. 3 is an explanatory graph showing an approximated gamma correction performed in the first embodiment.

The correction point data $CP^j$ has a role to determine the curve form of the approximate formula (3), and an appropriate determination of the correction point data $CP^j$ enables to perform the approximated gamma correction corresponding to a desired gamma value. As show in FIG. 3, the correction point data $CP^j$ is defined with respect to a gray-scale value $D_{IN}^{Center}$ [$=(D_{IN}^{MIN}+D_{IN}^{MAX})/2$] positioned between the $D_{IN}^{MIN}$ and $D_{IN}^{MAX}$. The correction point data $CP^j$ should be determined in the following formula (4) in order to perform the approximated gamma correction corresponding to a gamma value $\gamma_{logic}^j$ in the formula (3).

$$CP^j = \frac{4Gamma_j[D_{IN}^{Center}] - Gamma_j[D_{IN}^{MIN}] - Gamma_j[D_{IN}^{MAX}]}{2}, \quad (4)$$

In the above formula (4), $Gamma_j[x]$ is a function to indicate a rigorous formula of the gamma correction by the gamma value $\gamma_{logic}^j$, and defined in the following formula (5).

$$Gamma_j[x] = D\gamma^{MAX} \cdot (x/D_{IN}^{MAX})^{\gamma_{logic}^j}, \quad (5)$$

Subscript j indicates that the values of the gamma value $\gamma_{logic}^j$ and the $Gamma_j[x]$ may be different in R, G and B.

When the gamma correction is performed by the arithmetic operation indicated in the formula (3) using the correction point data $CP^j$ defined in the formula (4), and when the correction point data $CP^j$ is any one of the minimum value $D_{IN}^{MIN}$, the intermediate gray-scale value $D_{IN}^{Center}$ and the maximum value $D_{IN}^{MAX}$, the result of the gamma correction by the approximation formula meets with the result of the gamma correction by the rigorous formula.

An example case will be considered to perform the gamma correction on condition that the R data $D_{IN}^R$ are 6 bits, the corrected R data $D\gamma^R$ is 8 bits, and the R data $D_{IN}^R$ have the gamma value $\gamma_{logic}^R$ of 1.8. In this case, the following values are realized:

$$D_{IN}^{MIN}=0$$

$$D_{IN}^{MAX}=63$$

$$D_{IN}^{Center}=31.5$$

$$D\gamma^{MIN}=0$$

$$D\gamma^{MAX}=255$$

Further, the following values are obtained from the formula (5):

$$Gamma(D_{IN}^{MIN})=0$$

$$Gamma(D_{IN}^{MAX})=255$$

$$Gamma(D_{IN}^{Center})=73.23$$

These values and the formula (4) determine that the R correction point data $CP^R$ is 18.96. The approximated gamma correction can be performed in the gamma value $\gamma_{logic}^R=1.8$ for the R data $D_{IN}$ by calculating the corrected R data $D\gamma^R$ in accordance with the formula (3) on condition that the R correction point data $CP^R$ is 18.96.

The above described correction point data storing LUT 14 stores the correction point data $CP^j$ corresponding to each of the plurality of the gamma values $\gamma_{logic}^j$. The correction point data storing LUT 14 selects the R correction point data $CP^R$, the G correction point data $CP^G$ and the B correction point data $CP^B$ among the stored correction point data in response to the correction point selecting signal 24 supplied from the switching circuit 18, and supplies these selected correction point data to the approximate calculation correction circuit 13.

The display device 1 is configured to switch the gamma values for the gamma correction in the following operation. When the intensity of the external light is changed in the display device 1, the output signal of the external light sensor 6 is changed. The switching circuit 18 switches the correction point selecting signals 24 in response to the change of the output signal of the external light sensor 6. The correction point data storing LUT 14 changes the R correction point data $CP^R$, the G correction point data $CP^G$ and the B correction point data $CP^B$ to a desired value in response to the correction point selecting signal 24. The changed R correction point data $CP^R$, the changed G correction point data $CP^G$ and the changed B correction point data $CP^B$ are supplied to the approximate calculation correction circuit 13 so as to switch the gamma values for the gamma correction performed by the approximate calculation correction circuit 13.

The advantage of switching the gamma values in the above operation is that the gamma values can be switched in a short period of time. In this embodiment, it is not necessary to transfer the contents of the LUT for switching the gamma values, which is required in the conventional technique to perform the gamma correction using the LUT. For example, when the gamma correction is performed by the LUT having a 6-bit input and an 8-bit output, it is necessary to transfer data of 1536 ($=2^6\times8\times3$) bits to the LUT in order to switch the gamma values for R, G and B, respectively. On the other hand, in this embodiment, it is possible to switch the gamma values by supplying the approximate calculation correction circuit 13 with 30-bit data on condition that the R correction point data $CP^R$, the G correction point data $CP^G$ and the B correction point data $CP^B$ are respectively configured in 10 bits.

As explained above, the display device 1 according to this embodiment employs the approximation formula which is polynomial for performing the gamma correction by the approximate calculation correction circuit 13, and the correction point data to determine the coefficient of the approximation formula are selected based on the output signal of the external light sensor 6. The switch of the gamma values used for the gamma correction is executed by switching the correction point data.

These architectures enable the instant switch of the gamma values for the gamma correction on the basis of the change of a surrounding environment of the display device 1 while sustaining the small size of the circuit required for the gamma correction. Using the approximation formula with polynomial eliminates the necessity of the arithmetic operation of exponential or the table look-up operation for the gamma correction, and the size of the circuit required for the gamma correction can be minimized. Furthermore, since the gamma values for the gamma correction can be switched by supplying the correction point data with a small data size to the approximate calculation correction circuit 13 according to this embodiment, it is possible to switch the gamma values in a short period of time.

Environmental sensors other than the external light sensor 6 can be used to detect the change of the surrounding environment of the display device 1. For example, the gamma values can be controlled on the basis of the surrounding temperature of the display device 1 by using a temperature sensor to replace the external sensor 6. It is possible in the above described configuration to eliminate the effect of a temperature dependence of the gamma values in the liquid crystal panel 2 and improve the picture quality of the display image.

Second Embodiment

The formula (3) is replaced in the second embodiment to execute the arithmetic operation of the gamma correction by the approximate calculation units $\mathbf{31}_R$, $\mathbf{31}_G$ and $\mathbf{31}_B$. There are two objectives for the replacement; one objective is to minimize the erroneous difference between the arithmetic operation of the gamma correction executed by the approximate calculation units $\mathbf{31}_R$, $\mathbf{31}_G$ and $\mathbf{31}_B$, and the arithmetic operation of the gamma correction by the rigorous formula. The arithmetic operation of the gamma correction executed in the first embodiment is based on the quadratic polynomial, which is effective to minimize the circuit size. In this embodiment, the advantage of the small-sized circuit remains, providing a technique to minimize the erroneous difference against the arithmetic operation of the gamma correction by the rigorous formula.

The other objective is to realize executing division by using a small-sized circuit. As understood from the formula (3), the arithmetic operation of the gamma correction executed in the first embodiment involves division by $D_{IN}^{MAX}$. If $D_{IN}^{MAX}$ is a number to be expressed by exponential of two, the division can be executed by a bit shift processing and realized with a small-sized circuit. However, if $D_{IN}^{MAX}$ is not a number to be expressed by exponential of two, a division circuit needs to be used to execute the division by $D_{IN}^{MAX}$, which is not applicable to the reduction of the circuit size. For example, when R data $D_{IN}^R$, G data $D_{IN}^G$ and B data $D_{IN}^B$ are 6 bits, $D_{IN}^{MAX}$ is 63. When R data $D_{IN}^R$, G data $D_{IN}^G$ and B data $D_{IN}^B$ are 8 bits, $D_{IN}^{MAX}$ is 255. If the division can be eliminated except for the division executed for the number to be expressed by exponential of two in the arithmetic operation of the gamma correction, the circuit size of the approximate calculation correction circuit 13 can be minimized.

To achieve these objectives, the second embodiment switches coefficients of the approximation formula by the classification of the input gray-scale data $D_{IN}$ on the basis of the data values. Specifically, in this embodiment, the corrected R data $D\gamma^R$, the corrected G data $D\gamma^G$ and the corrected B data $D\gamma^B$ are calculated by the following formula (6a) when the R data $D_{IN}^R$, G data $D_{IN}^G$ and B data $D_{IN}^B$ are smaller than the gray-scale value $D_{IN}^{Center}$.

$$D\gamma^j = \frac{D\gamma^{MIN}(D_{IN3} - D_{IN}^j)^2 + 2CP_1^j (D_{IN3} - D_{IN}^j)(D_{IN}^j - D_{IN}^{MIN}) + CP_3^j (D_{IN}^j - D_{IN}^{MIN})^2}{(D_{IN3})^2}, \tag{6a}$$

In the above formula (6a), j is an arbitrary symbol selected from R, G and B. Meanwhile, the corrected R data $D\gamma^R$, the corrected G data $D\gamma^G$ and the corrected B data $D\gamma^B$ are calculated by the following formula (6b) when the R data $D_{IN}^R$, the G data $D_{IN}^G$ and the B data $D_{IN}^B$ are larger than the gray-scale value $D_{IN}^{Center}$.

$$D\gamma^j = \frac{CP_2^j (D_{IN}^{MAX} - D_{IN}^j)^2 + 2CP_4^j (D_{IN}^{MAX} - D_{IN}^j)(D_{IN}^j - D_{IN2}) + D\gamma^{MAX} (D_{IN}^j - D_{IN2})^2}{(D_{IN}^{MAX} - D_{IN2})^2}, \tag{6b}$$

Figure 4:
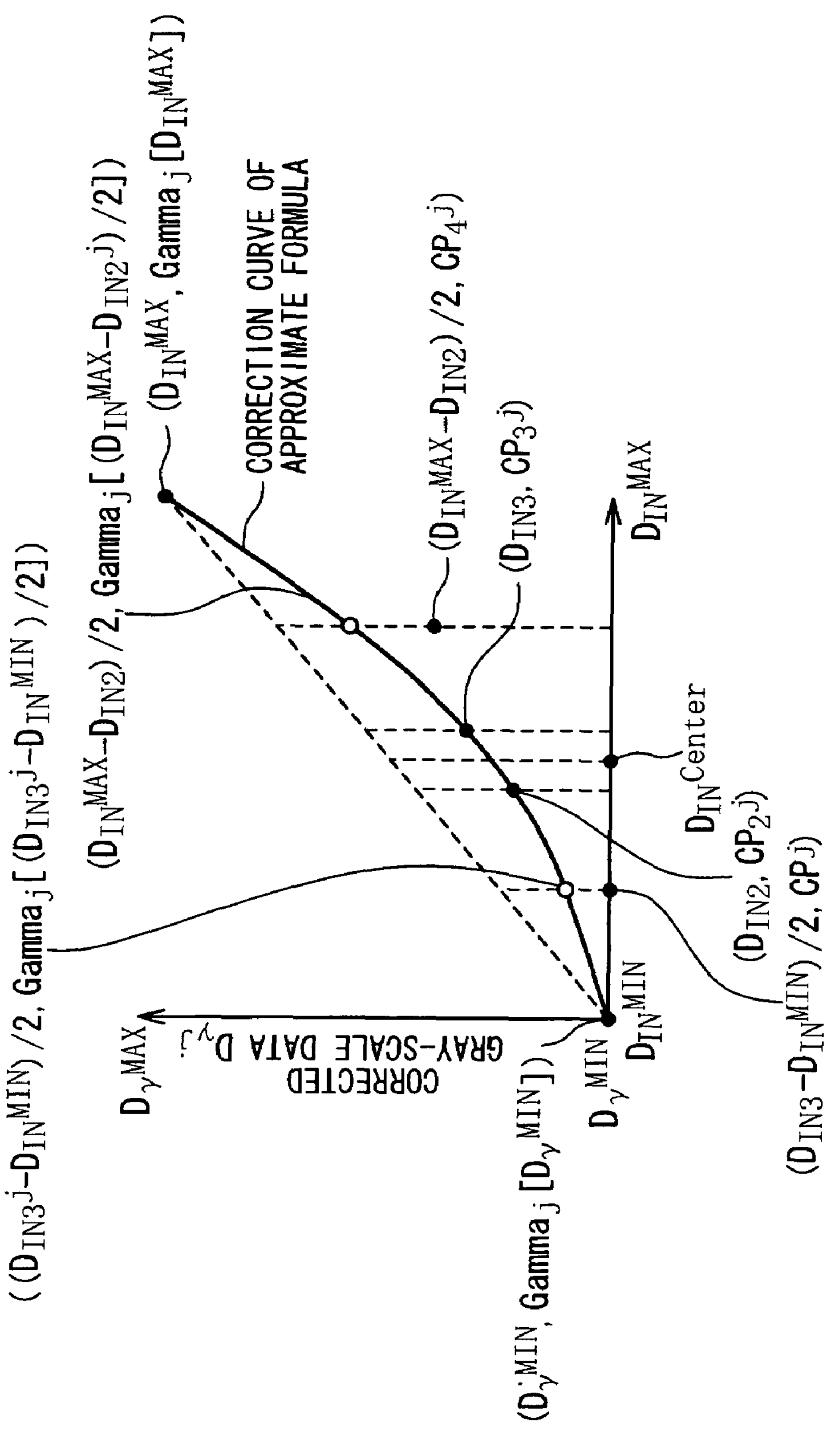
FIG. 4 is an explanatory graph for an approximated gamma correction performed in a second embodiment.

$CP_1^j$, $CP_2^j$, $CP_3^j$ and $CP_4^j$ shown in the formulas (6a) and (6b) are the correction point data defined by the following formulas (7a) to (7d) referring to FIG. 4:

$$CP_1^j = \frac{4Gamma_j[(D_{IN3} - D_{IN}^{MIN})/2] - Gamma_j[D_{IN}^{MIN}] - Gamma_j[D_{IN3}]}{2}, \tag{7a}$$

$$CP_2^j = Gamma_j[D_{IN2}], \tag{7b}$$

$$CP_3^j = Gamma_j[D_{IN3}], \tag{7c}$$

$$CP_4^j = \frac{Gamma_j[(D_{IN}^{MAX} - D_{IN2})/2] - Gamma_j[D_{IN2}] - Gamma_j[D_{IN}^{MAX}]}{2}, \tag{7d}$$

$D_{IN2}$ and $D_{IN3}$ are the values to satisfy the following condition (8):

$$D_{IN}^{MIN} < D_{IN2} < D_{IN}^{Center} > D_{IN3} < D_{IN}^{MAX}, \tag{8}$$

As understood from the formulas (7b) and (7c), $CP_2^j$ and $CP_3^j$ are the correction point data which are defined corresponding to the gray-scale data $D_{IN2}$ and $D_{IN3}$, respectively. Meanwhile, as understood from the formulas (7a) and (7d), $CP_1^j$ and $CP_4^j$ are the correction point data defined with respect to the gray-scale data $D_{IN1}$ and $D_{IN4}$ which are defined by the following formulas (9a) and (9b), respectively.

$$D_{IN1} = (D_{IN3} - D_{IN}^{MIN})/2, \tag{9a}$$

$$D_{IN4} = (D_{IN}^{MAX} - D_{IN2})/2, \tag{9b}$$

In this embodiment, a plurality of groups of $CP_1^j$, $CP_2^j$, $CP_3^j$ and $CP_4^j$, which are defined by the formulas (7a) to (7d), are stored in the correction point data storing LUT 14. The correction point data storing LUT 14 selects an appropriate group of $CP_1^j$, $CP_2^j$, $CP_3^j$ and $CP_4^j$ in response to the correction point selecting signal 24, and supplies the selected group of $CP_1^j$, $CP_2^j$, $CP_3^j$ and $CP_4^j$ to the approximate calculation correction circuit 13. The approximate calculation units $\mathbf{31}_R$, $\mathbf{31}_G$ and $\mathbf{31}_B$ of the approximate calculation correction circuit 13 calculate the corrected R data $D\gamma^R$, corrected G data $D\gamma^G$ and corrected B data $D\gamma^B$ by the arithmetic operation indicated in the formulas (6a) and (6b), respectively. The switch of the gamma values $\gamma_{logic}^j$ for the gamma correction is implemented by changing $CP_1^j$, $CP_2^j$, $CP_3^j$ and $CP_4^j$.

One of the advantages of performing the gamma correction by using the formulas (6a) and (6b) is to reduce the erroneous difference in the gamma correction by the approximation formula against the gamma correction by the rigorous formula. It is effective to selectively use any one of the formulas (6a) and (6b) on the basis of the value of the input gray-scale data $D_{IN}^j$ for reducing the erroneous difference in the gamma correction by the approximation formula against the gamma correction by the rigorous formula. Besides, this employment using the formulas (6a) and (6b) as defined above enables the result of the gamma correction by the approximation formula to meet with the result of the gamma correction by the rigorous formula in the six cases of the input gray-scale data $D_{IN}^j$. Here, in the six cases, the input gray-scale data $D_{IN}^j$ are the minimum value $D_{IN}^{MIN}$, the gray-scales values $D_{IN1}$, $D_{IN2}$, $D_{IN3}$, $D_{IN4}$ and the maximum value $D_{IN}^{MAX}$, respectively. This means that the gamma correction using the formulas (6a) and (6b) is effective to reduce the erroneous difference against the gamma correction by the rigorous formula in comparison with the gamma correction using the formula (3). In the gamma correction by the formula (3), it should be noted that the result of the gamma correction by the approximation formula meets with the result of the gamma correction by the rigorous formula only in the three cases of the input gray-scale data $D_{IN}^j$. Here, in the three cases, the input gray-scale data $D_{IN}^j$ are the minimum value $D_{IN}^{MIN}$, the intermediate gray-scale value $D_{IN}^{Center}$ and the maximum value $D_{IN}^{MAX}$.

It should be noted that the coefficient of the formula (6a) corresponding to the input gray-scale data $D_{IN}^j$ which is smaller than the gray-scale value $D_{IN}^{Center}$ is defined by using the gray-scale value $D_{IN3}$ which is larger than the gray-scale value $D_{IN}^{Center}$, and the corresponding correction point data $CP_3^j$. Similarly, it should be noted that the coefficient of the formula (6b) corresponding to the input gray-scale data $D_{IN}^j$ which is larger than the gray-scale value $D_{IN}^{Center}$ is defined by using the gray-scale value $D_{IN2}$ which is smaller than the gray-scale value $D_{IN}^{Center}$ and the corresponding correction point data $CP_2^j$. The formulas (6a) and (6b) are thus defined to enable a smooth connection between a curve indicated in the formula (6a) and a curve indicated in the formula (6b) in the gray-scale value $D_{IN}^{Center}$. It is effective to appropriately calculate the corrected R data $D\gamma^R$, the corrected G data $D\gamma^G$ and the corrected B data $D\gamma^B$.

Another advantage of performing the gamma correction by using the formulas (6a) and (6b) is that a division involved in the gamma correction can be realized in a bit shift circuit by appropriately selecting the gray-scale values $D_{IN2}$ and $D_{IN3}$. With regard to the formula (6a), for example, it is possible to realize a division by the gray-scale value $D_{IN3}$ in the bit shift circuit if the gray-scale value $D_{IN3}$ is selected to be an exponential of two. Similarly, with regard to the formula (6b), it is possible to realize a division by the gray-scale value ($D_{IN}^{MAX} - D_{IN2}$) in the bit shift circuit if ($D_{IN}^{MAX} - D_{IN2}$) is selected to be an exponential of two in the gray-scale value $D_{IN2}$. It is effectively in the reduction of the circuit size to realize divisions in the bit shift circuit.

Although two case classifications are carried out in this embodiment, furthermore case classifications can be carried out for the input gray-scale data $D_{IN}$. The increase in the number of the case classification is effective to further reduce the erroneous difference against the rigorous formula. For example, the coefficients of the approximation formula can be switched by 4 case classifications and 8 case classifications.

Third Embodiment

In the techniques using the quadratic polynomial as the approximation formula in the first and second embodiments, a fairly good approximation can be obtained for a large gamma value. However, in the case of a small gamma value, particularly when the gamma values $\gamma_{logic}^j$ is less than 1, the quadratic polynomial is not suitable for performing the approximated gamma correction. A technique is provided in a third embodiment to perform the gamma correction controlled by a gray-scale voltage in addition to the gamma correction by a data processing in order to obtain a good approximation for the gamma correction with a relatively small gamma value.

Figure 5:
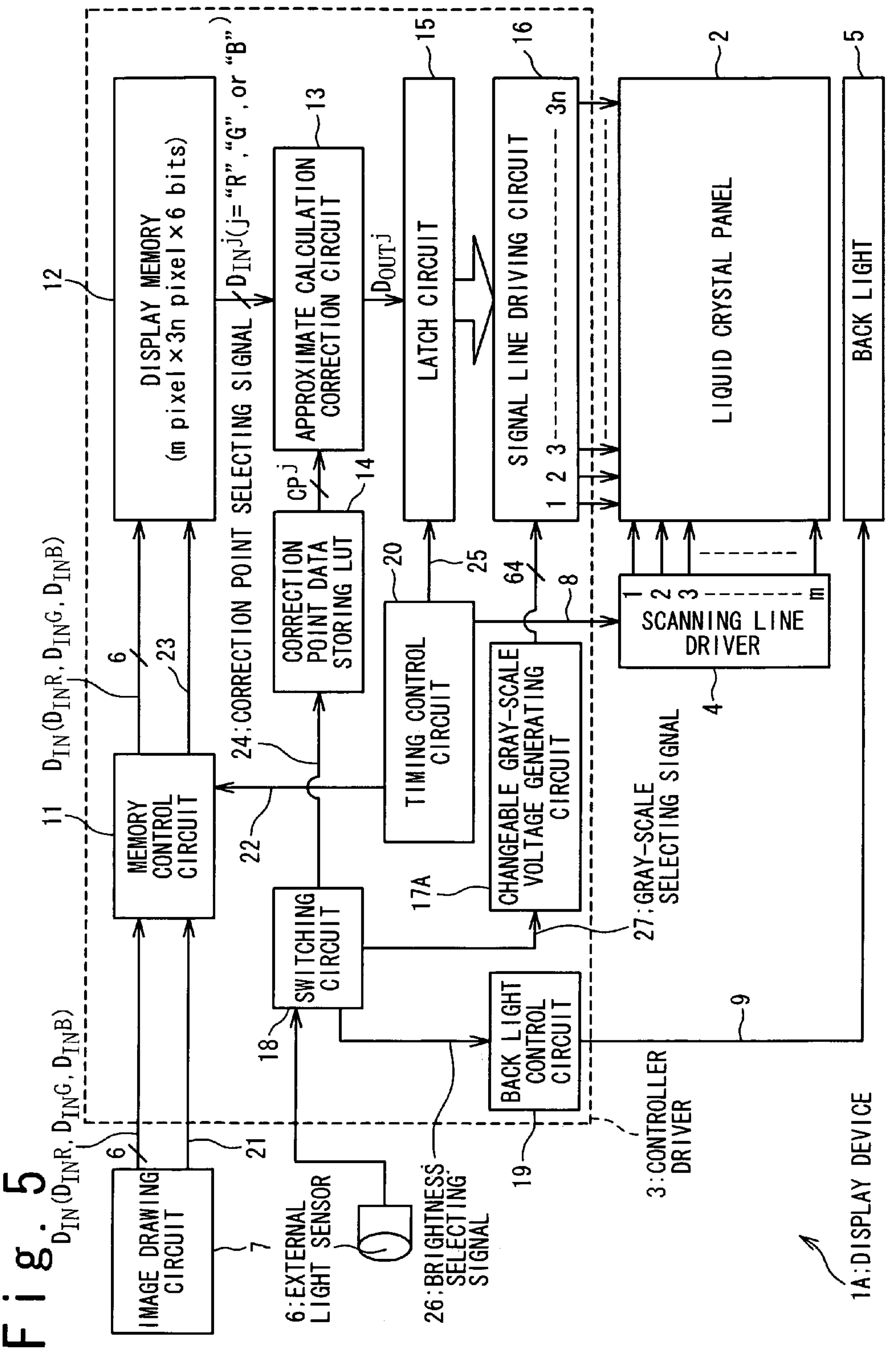
FIG. 5 is a block diagram showing a configuration of a display device according to a third embodiment of the present invention.
Figure 6A:
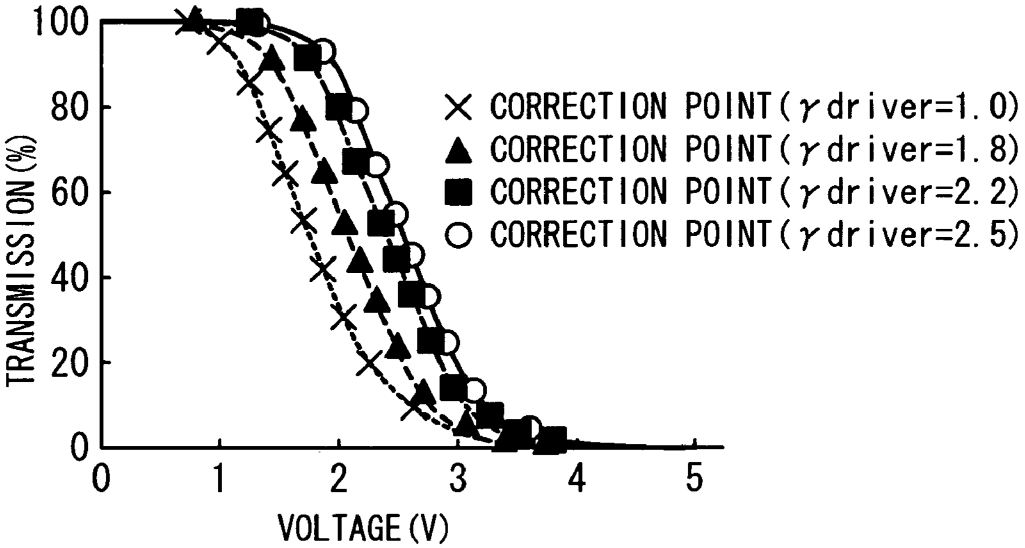
FIGS. 6A and 6B are conceptual diagrams explaining a gamma correction controlled by a gray-scale voltage according to the third embodiment.
Figure 6B:
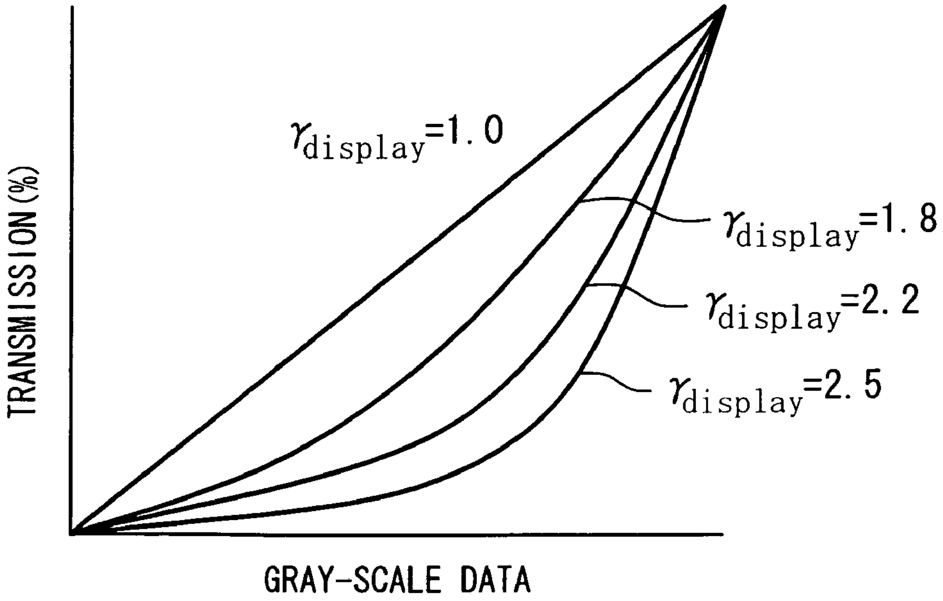

FIG. 5 is a block diagram showing a configuration of a display device 1A according to the third embodiment. The difference of the display device 1A of the third embodiment to the display device 1 of the first embodiment is that a changeable gray-scale voltage generating circuit 17A is used to replace the gray-scale voltage generating circuit 17, and the switching circuit 18 is provided with a function to control the changeable gray-scale voltage generating circuit 17A. The switching circuit 18 specifies a gamma value $\gamma_{drive}$, which is used for the gamma correction controlled by the gray-scale voltage in the changeable gray-scale voltage generating circuit 17A, by using a gray-scale selecting signal 27. In this embodiment, the gamma value $\gamma_{drive}$ is changeable on the basis of the gray-scale selecting signal 27 supplied form the switching circuit 18. As shown in FIG. 6, the switching circuit 18 switches a plurality of the gamma values that are set in consideration with the V-T characteristics.

In the controller driver 3 having above-mentioned configuration, gamma values $\gamma_{display}^R$, $\gamma_{display}^G$ and $\gamma_{display}^B$ as the entire gamma correction performed for the R data $D_{IN}^R$, the G data $D_{IN}^G$ and the B data $D_{IN}^B$ are expressed by the following formulas (11a) to (11c):

$$\gamma_{display}^R = \gamma_{drive} \cdot \gamma_{logic}^R, \tag{11a}$$

$$\gamma_{display}^G = \gamma_{drive} \cdot \gamma_{logic}^G, \tag{11b}$$

$$\gamma_{display}^B = \gamma_{drive} \cdot \gamma_{logic}^B, \tag{11c}$$

In the above formulas (11a) to (11c), $\gamma_{logic}^R$, $\gamma_{logic}^G$ and $\gamma_{logic}^B$ are gamma values of the gamma correction by the data processing which is executed by the approximate calculation units $\mathbf{31}_R$, $\mathbf{31}_G$ and $\mathbf{31}_B$.

In this embodiment, the gamma value $\gamma_{drive}$ for the gamma correction controlled by the gray-scale voltage is specified so that the gamma values $\gamma_{logic}^R$, $\gamma_{logic}^G$ and $\gamma_{logic}^B$ for the gamma correction performed by the data processing do not become less than 1, and the entire gamma values $\gamma_{display}^R$, $\gamma_{display}^G$ and $\gamma_{display}^B$ are caused to be a desired value. It can be achieved in the state that the gamma value $\gamma_{drive}$ for the gamma correction controlled by the gray-scale voltage is determined so as not to exceed any one of the entire gamma values $\gamma_{display}^R$, $\gamma_{display}^G$ and $\gamma_{display}^B$. For example, when the gamma correction is performed to realize $\gamma_{display}^R$ of 1.8 in the R data $D_{IN}^R$, $\gamma_{drive}$ is set to be 1.2 and the correction point data $CP^R$ (or the correction point data $CP_1^R$ to $CP_4^R$) are set in the approximate calculation unit $\mathbf{31}_R$ in which $\gamma_{logic}^R$ is 1.5. It is effective in the reduction of the erroneous difference of the gamma correction by the approximation formula to sustain the gamma values $\gamma_{logic}^R$, $\gamma_{logic}^G$ and $\gamma_{logic}^B$ for the gamma correction by the data processing to be 1 or more.

FIG. 7 is a chart showing an example of an operation in the display device 1A of the present embodiment. The switching circuit 18 generates the brightness selecting signal 9 to specify the brightness of the back light 5 in response to the output signal of the external light sensor 6. Stronger external light received by the external light sensor 6 causes the brightness of the back light 5 to be increased more. Moreover, the switching circuit 18 specifies the gamma value $\gamma_{drive}$ to be used in the changeable gray-scale voltage generating circuit 17A by using a gray-scale selecting signal 27, and also specifies the gamma values $\gamma_{logic}^R$, $\gamma_{logic}^G$ and $\gamma_{logic}^B$ to be used in the approximate calculation units $\mathbf{31}_R$, $\mathbf{31}_G$ and $\mathbf{31}_R$ by using the correction point selecting signal 24. The gamma value $\gamma_{drive}$ and the gamma values $\gamma_{logic}^R$, $\gamma_{logic}^G$ and $\gamma_{logic}^B$ are specified so that the gamma values $\gamma_{display}^R$, $\gamma_{display}^G$ and $\gamma_{display}^B$ are caused to be a desired value, and the gamma values $\gamma_{logic}^R$, $\gamma_{logic}^G$ and $\gamma_{logic}^B$ do not become less than 1. For example, the gamma correction with the entire gamma value $\gamma_{display}^R$ of 2.2 can be achieved by setting the gamma value $\gamma_{drive}$ in 2.0 and the gamma values $\gamma_{logic}^R$ in 1.1. These operations enable to perform the gamma correction by a desired gamma value while reducing the erroneous difference of the gamma correction by the approximation formula.

Fourth Embodiment

Figure 8:
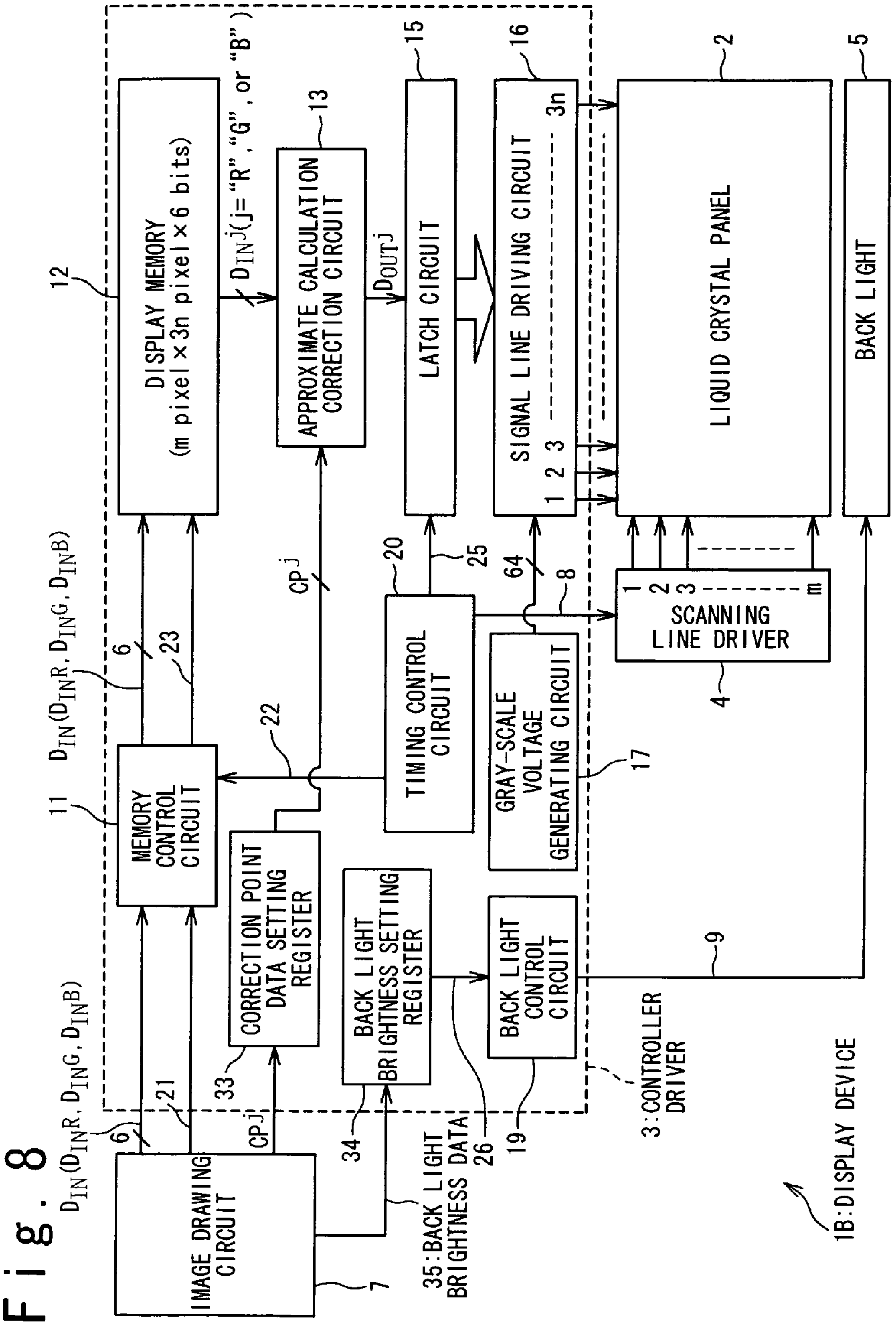
FIG. 8 is a block diagram showing a configuration of a display device according to a fourth embodiment of the present invention.

FIG. 8 is a block diagram showing a configuration of a display device 1B according to a fourth embodiment. The difference of the display device 1B of the forth embodiment to the display device 1 of the first embodiment is that the switch of the gamma value $\gamma_{logic}^j$ used for the gamma correction and the control of the brightness of the back light 5 are not executed in accordance with the output of the external sensor 6, but executed by the image drawing circuit 7. Therefore, the display device 1B of the fourth embodiment is includes a correction point data setting register 33 and a back light brightness setting register 34 to replace the correction point data storing LUT 14 and the switching circuit 18. The correction point data setting register 33 stores the correction point data $CP^j$ that are received from the image drawing circuit 7. The back light brightness setting register 34 stores back light brightness data 35 to determine the brightness of the back light 5 which is received from the image drawing circuit 7. The other configuration of the display device 1B in the fourth embodiment is the same with the display device 1 in the first embodiment.

In the fourth embodiment, the brightness of the back light 5 is adjusted by the setting of the back light brightness data 35, and the gamma values used for the gamma correction are switched by the setting of the correction point data $CP^j$. Therefore, it is aimed to realize the optimum display corresponding to the brightness of the back light by not only performing the gamma correction for the respective colors of RGB in the liquid crystal panel 2, but also adjusting images such as a contrast correction.

In this embodiment, the formulas (6a) and (6b) are replaced by formulas (12a) and (12b) in the approximate calculation units $\mathbf{31}_R$, $\mathbf{31}_G$ and $\mathbf{31}_B$ of the approximate calculation correction circuit 13.

$$D\gamma^j = \frac{CP_0^j(D_{IN3} - D_{IN}^j)^2 + 2CP_1^j(D_{IN3} - D_{IN}^j)(D_{IN}^j) + CP_3^j(D_{IN}^j)^2}{(D_{IN3})^2}, \tag{12a}$$

$$D\gamma^j = \frac{CP_2^j(D_{IN}^{MAX} - D_{IN}^j)^2 + 2CP_4^j(D_{IN}^{MAX} - D_{IN}^j)(D_{IN}^j - D_{IN2}) + CP_5^j(D_{IN}^j - D_{IN2})^2}{(D_{IN}^{MAX} - D_{IN2})^2}, \tag{12b}$$

In the above formulas (12a) and (12b), $CP_0^j$, $CP_1^j$, $CP_2^j$, $CP_3^j$, $CP_4^j$ and $CP_5^j$ are the correction point data which are supplied from the image drawing circuit 7 and stored in the correction point data setting register 33. It should be noted that the formulas (12a) and (12b) are obtained by setting $D_{IN}^{MIN}$ and $D\gamma^{MIN}$ in 0, and replacing $D\gamma^{MIN}$ (=Gamma$_j$[$D_{IN}^{MIN}$]) with the correction point data $CP_0^j$ and $D\gamma^{MAX}$ (=Gamma$_j$ [$D_{IN}^{MAX}$]) with the correction point data $CP_5^j$ in the formulas (6a) and (6b).

Figure 9:
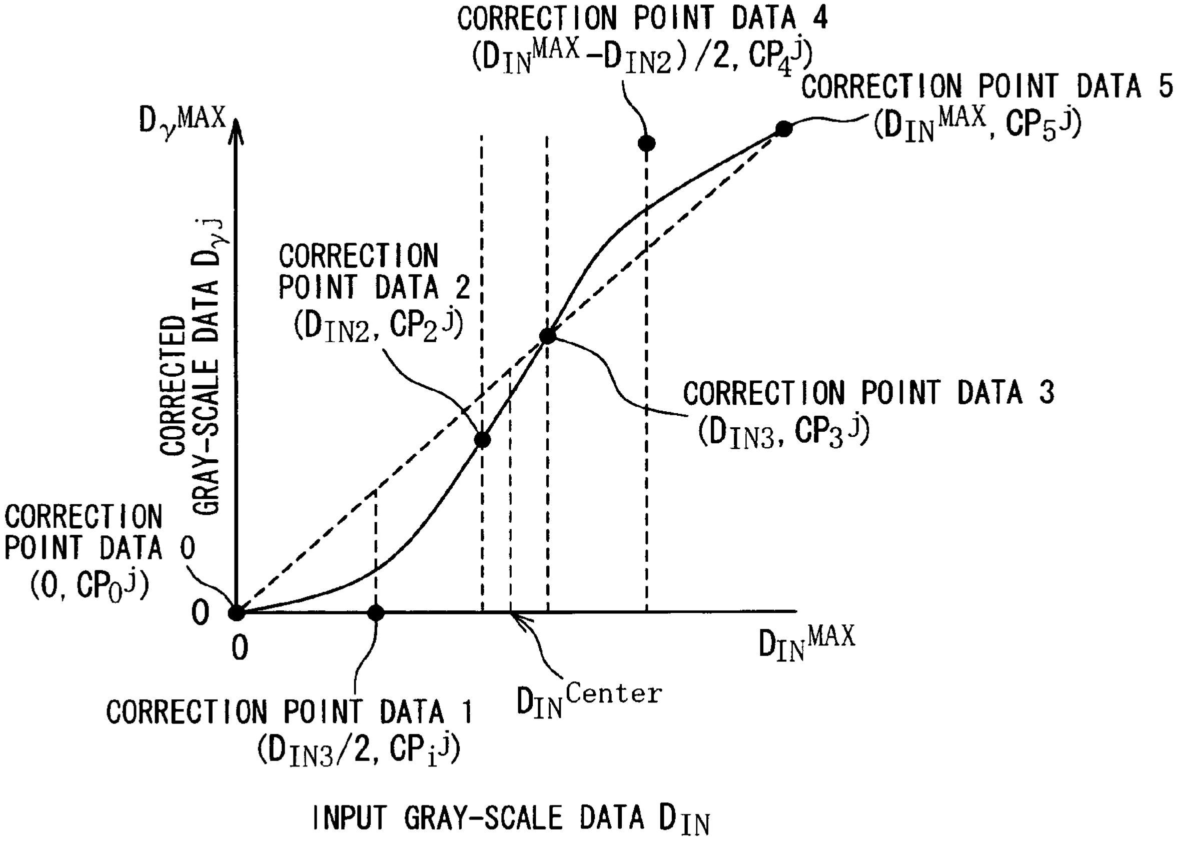
FIG. 9 is a graph explaining a contrast correction performed in the fourth embodiment.

As shown in FIG. 9, it is possible to perform the contrast correction by using the correction point data $CP_0^j$, $CP_1^j$, $CP_2^j$, $CP_3^j$, $CP_4^j$ and $CP_5^j$ which are stored in the correction point data setting register 33.

Fifth Embodiment

Figure 10:
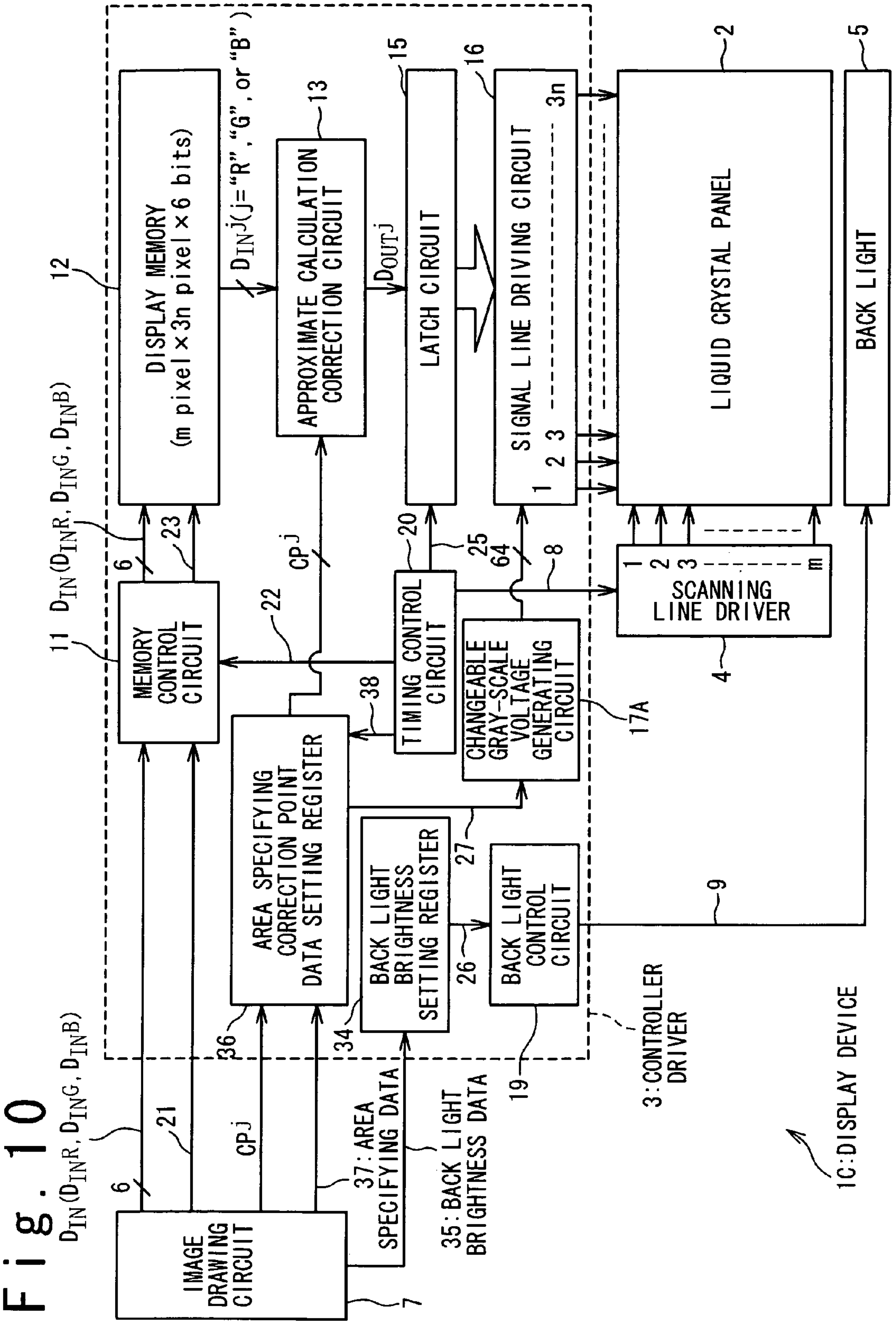
FIG. 10 is a block diagram showing a configuration of a display device according to a fifth embodiment of the present invention.
Figure 11:
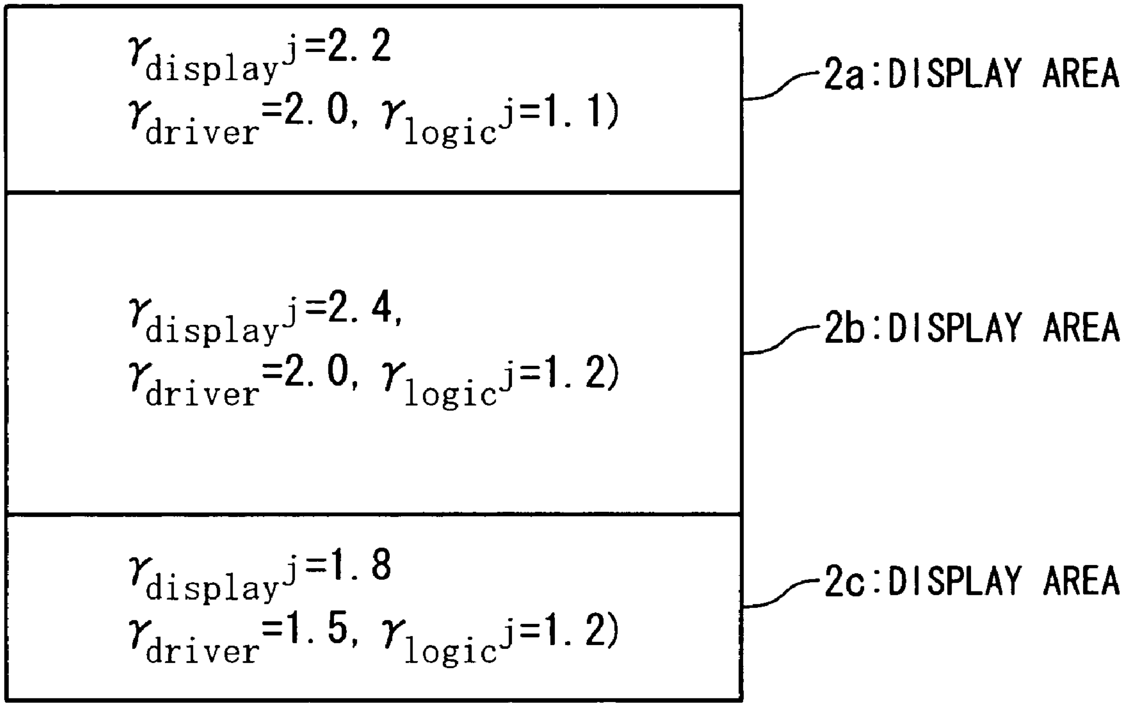
FIG. 11 is an explanatory diagram for an example of an image shown on a liquid crystal display panel by a gamma correction performed in the fifth embodiment of the present invention.

FIG. 10 is a block diagram showing a configuration of a display device 1C according to a fifth embodiment. In the fifth embodiment, the liquid crystal panel 2 is divided into a plurality of display areas 2*a* to 2*c* as shown in FIG. 11, wherein the gamma correction using different gamma values is performed for each of the display areas 2*a* to 2*c*. To realize the above operation, the display device 1C of the fifth embodiment includes an area specifying correction point data setting register 36 as shown in FIG. 10 to replace the correction point data setting register 33 of the display device 1B in the fourth embodiment. The display device 1C also includes the changeable gray-scale voltage generating circuit 17A to replace the gray-scale voltage generating circuit 17. The other configuration of the display device 1C in the fifth embodiment is the same with the display device 1B in the fourth embodiment.

The area specifying correction point data setting register 36 stores an area specifying data 37 and the correction point data $CP^j$ corresponding to each of the display areas 2*a* to 2*c* which are supplied from the image drawing circuit 7. The area specifying data 37 includes data to define the location of the display areas 2*a* to 2*c* in the liquid crystal panel 2, and data to specify the gamma value $\gamma_{drive}$ (i.e. the gamma value $\gamma_{drive}$ the gamma correction controlled by the gray-scale voltage) to be used in the changeable gray-scale voltage generating circuit 17A when images are displayed in each of the display areas 2*a* to 2*c*. The area specifying correction point data setting register 36 specifies the gamma value $\gamma_{drive}$ to be used to the changeable gray-scale voltage generating circuit 17A by using a gray-scale selecting signal 27. Besides, the area specifying correction point data setting register 36 stores different correction point data $CP^j$ for each of the display areas 2*a* to 2*c*. The area specifying correction point data setting register 36 switches the correction point data $CP^j$ to supply to the approximate calculation correction circuit 13 and the gamma values $\gamma_{drive}$ specified by the gray-scale selecting signal 27 on the basis of the location of the pixel to be driven in any of the display areas 2*a* to 2*c*. The timing to switch the correction point data $CP^j$ and the gamma values $\gamma_{drive}$ is controlled by a correction point data switching signal 38 supplied from the timing control circuit 20.

FIG. 11 is a diagram showing an operation to change the gamma values $\gamma_{display}{}^j$ in each of the display areas 2*a* to 2*c* provided in the vertical direction, as an example of an operation of the liquid crystal display device 10 according to the fifth embodiment. The area specifying correction point data setting register 36 stores three kinds of the correction point data $CP^j$ corresponding to each of the display areas 2*a* to 2*c*. The correction point data $CP^j$, which are read out in response to the correction point data switching signal 38, are switched. The input gray-scale data $D_{IN}{}^j$ read out from the display memory 12 are treated by the data correction processing on the basis of the correction point data supplied from the area specifying correction point data setting register 36. Simultaneously, the gamma values $\gamma_{drive}$ set in the changeable gray-scale voltage generating circuit 17A by the gray-scale selecting signal 27 are switched in response to the correction point data switching signal 38. Therefore, as shown in FIG. 11, the gamma values $\gamma_{display}{}^j$ are changed in each of the display areas 2*a* to 2*c*.

Figure 12:
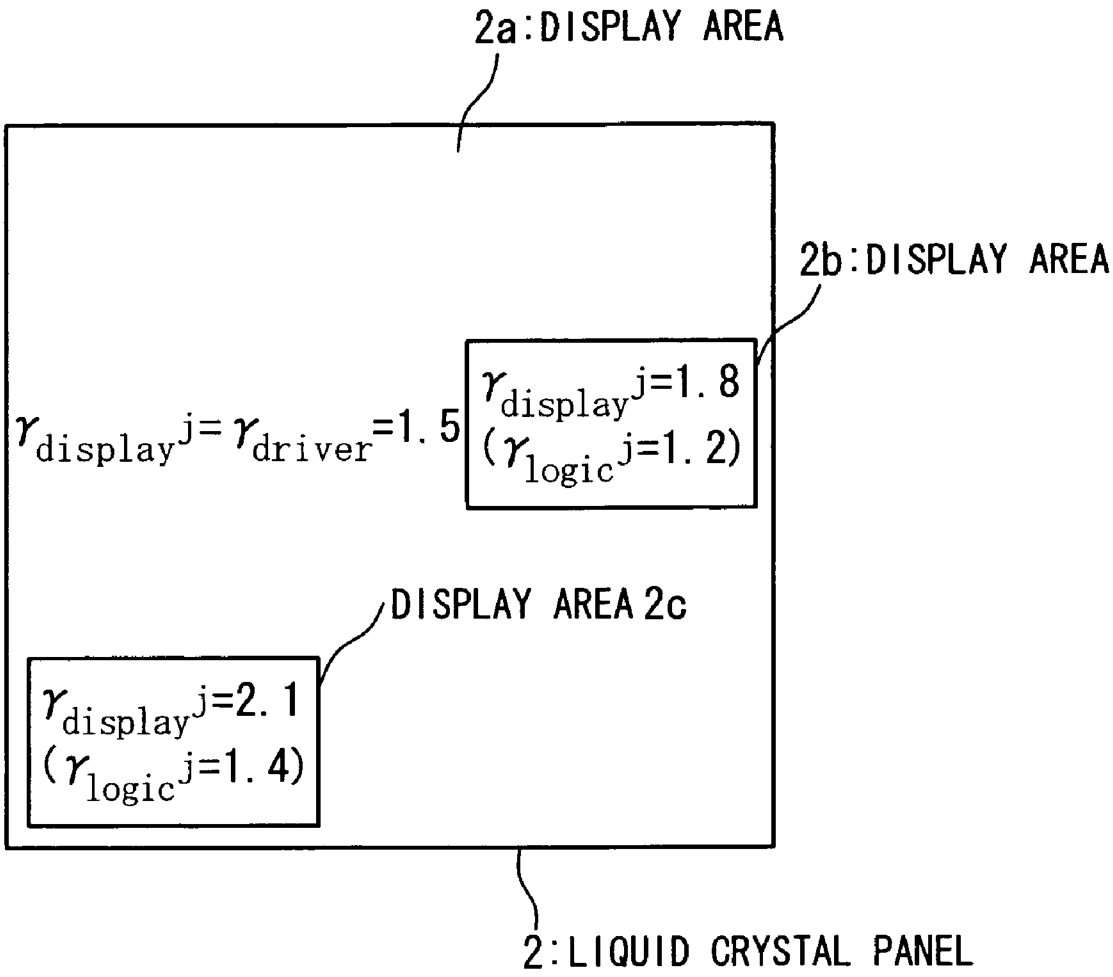
FIG. 12 is an explanatory diagram for another example of an image shown on a liquid crystal display panel by a gamma correction performed in the fifth embodiment of the present invention.

As shown in FIG. 12, it is unnecessary to determine the display areas 2*a* to 2*c* in such a manner to cross the liquid crystal panel 2 in the lateral direction. The display areas can be specified in a position away from the outer end of the liquid crystal panel 2 wherein the gamma values are set in each of the display areas. In this case, the correction point data switching signal 38 is generated by corresponding to a horizontal position signal and a vertical position signal of the images.

Sixth Embodiments

Figure 13:
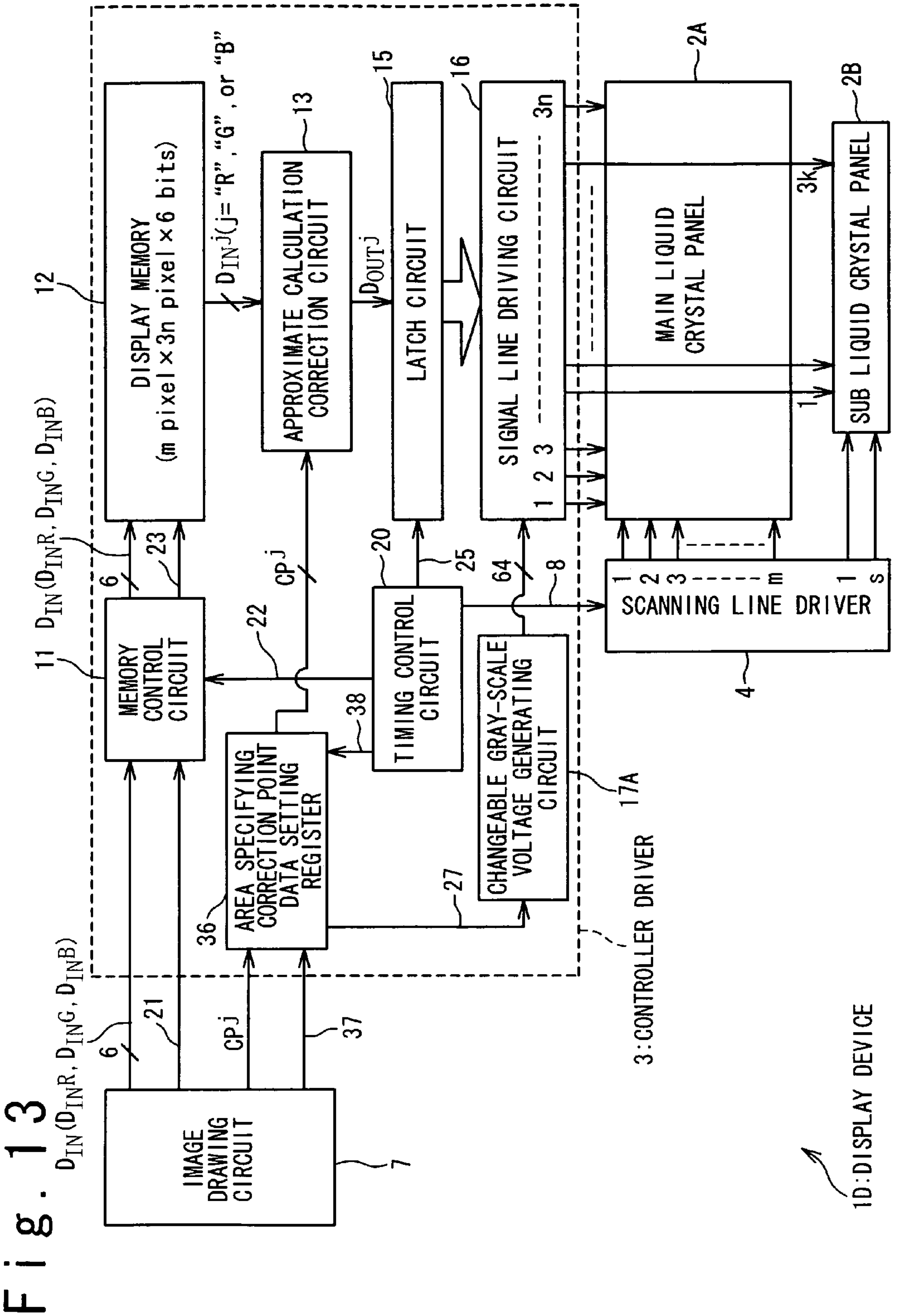
FIG. 13 is a block diagram showing a configuration of a display device according to a sixth embodiment of the preset invention.

FIG. 13 is a block diagram showing a configuration of a display device 1D according to a sixth embodiment. In the display device 1D of the sixth embodiment, two liquid crystal panels including a main liquid crystal panel 2A and a sub liquid crystal panel 2B are driven by one controller driver 3. The signal lines of the sub liquid crystal panel 2B are connected to the signal lines of the main liquid crystal panel 2A, and the signal lines of the main liquid crystal panel 2A are driven by the signal line driving circuit 16. The signal lines of the sub liquid crystal panel 2B are driven by driving the signal lines of the main liquid crystal panel 2A in the state that gate lines of the main liquid crystal panel 2A are inactivated. Driving voltages are provided to the signal lines of the sub liquid crystal panel 2B through the signal lines of the main liquid crystal panel 2A.

Figure 14:
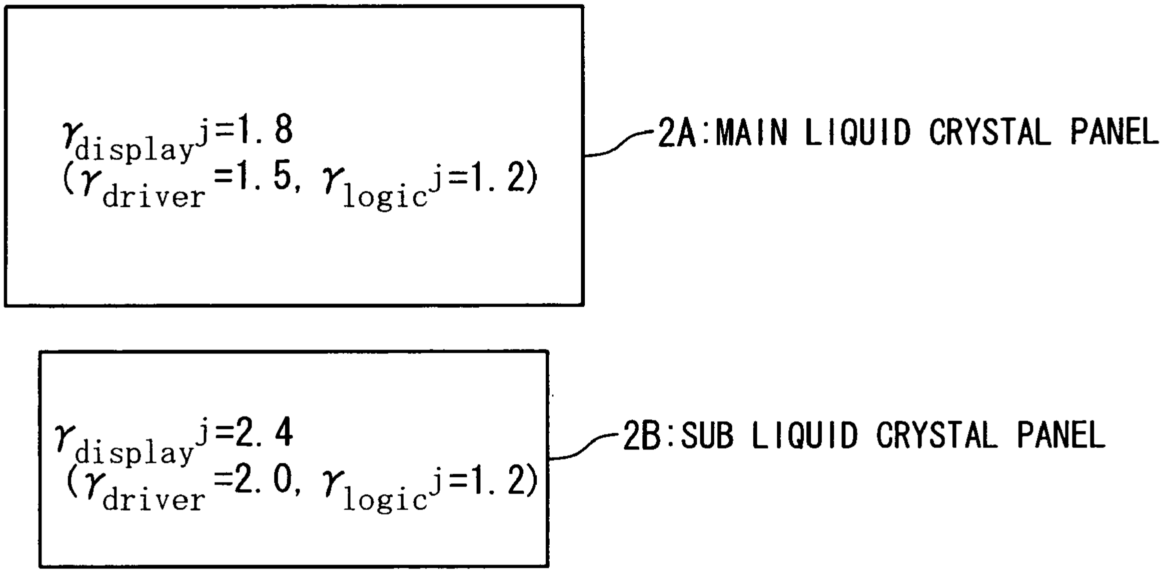
FIG. 14 is an explanatory diagram for an example of an image shown on a main liquid crystal display panel and a sub liquid crystal display panel by a gamma correction performed in the sixth embodiment of the present invention.

In this case, the correction point data for the main liquid crystal panel 2A and the correction point data $CP^j$ for the sub liquid crystal panel 2B are stored in the area specifying correction point data setting register 36, wherein the gamma values $\gamma_{display}{}^j$ displayed on the main liquid crystal panel 2A and the sub liquid crystal panel 2B can be changed as shown in FIG. 14 by switching the correction point data $CP_j$ to be read out in displaying images on the respective liquid crystal panels. According to the display device 1D of the present embodiment, it is possible to realize the optimum image display on the main liquid crystal panel 2A and the sub liquid crystal panel 2B.

According to the present invention, it is possible to switch the correction curves in a short period of time in accordance with the changes of a surrounding environment in a display device with a small circuit size.

It is apparent that the present invention is not limited to the above embodiment that may be modified and changed without departing from the scope and spirit of the invention.

What is claimed is:

1. A controller driver, comprising:

an area specifying correction point data setting register configured to store a plurality of correction data, each of which is set correspondingly to one of a plurality of display areas of a display panel;

a correction circuit configured to generate a corrected gray-scale data on a basis of input gray-scale data; and a driving circuit configured to drive respective ones of said plurality of display areas of said display panel in response to said corrected gray-scale data, wherein said correction circuit generates said corrected gray-scale data by executing a correction using a polynomial in which said input gray-scale data are used as variables, and wherein coefficients of said polynomial are changed in response to an output signal supplied from outside of said correction circuit, wherein said area specifying correction point data setting register selects a corresponding one of said plurality of correction data on a basis of said respective display area including a display position of said input gray-scale data supplied to said correction circuit, wherein said polynomial is a quadratic polynomial with respect to said input gray-scale data, which is set such that a gamma correction, which corresponds to a gamma curve with respect to a second gamma value of $\gamma_{logic}$, is approximately executed, wherein an entire gamma value of $\gamma_{display}$ is defined by a following formula:

$$\gamma_{display}=\gamma_{drive}\times\gamma_{logic},$$

said $\gamma_{drive}$ is set not to exceed said $\gamma_{display}$.

2. The controller driver according to claim 1, wherein said output signal is supplied from said area specifying correction point data setting register and includes said corresponding one of said plurality of correction data, and wherein coefficients of said polynomial are set by using said corresponding one of said plurality of correction data.

3. The controller driver according to claim 1, wherein said corrected gray-scale data is calculated by using a following formula:

$$D\gamma = \frac{D\gamma^{MIN}(D_{IN3} - D_{IN})^2 + 2CP_1(D_{IN3} - D_{IN})(D_{IN} - D_{IN}^{MIN})}{(D_{IN3})^2} + CP_3(D_{IN} - D_{IN}^{MIN})^2,$$

wherein, when said input gray-scale data is in said first range, said corrected gray-scale data is calculated by using a following formula:

$$D\gamma = \frac{CP_2(D_{IN}^{MAX} - D_{IN})^2 + 2CP_4(D_{IN}^{MAX} - D_{IN})(D_{IN} - D_{IN2})}{(D_{IN}^{MAX} - D_{IN2})^2} + D\gamma^{MAX}(D_{IN} - D_{IN2})^2,$$

when said input gray-scale data is in said second range, wherein said $D\gamma$ is said corrected gray-scale data, said $D_{IN}$ is said input gray-scale data, said $CP_1$ to $CP_4$ are said first to fourth correction data, said $D\gamma^{MIN}$, said $D\gamma^{MAX}$, said $D_{IN2}$ and said $D_{IN3}$ are predetermined parameters.

4. The controller driver according to claim 3, wherein said $D_{IN3}$ is a number expressed by using an exponential of two.

5. The controller driver according to claim 4, wherein said $D_{IN2}$ is defined as a number, of which $(D_{IN}^{MAX} - D_{IN2})$ is a number expressed by using an exponential of two.

6. The controller driver according to claim 4, wherein said $D_{IN2}$ and said $D_{IN3}$ are set to satisfy a following formula:

$$D_{IN}^{MIN} < D_{IN2} < D_{IN}^{Center} < D_{IN3} < D_{IN}^{MAX},$$

wherein Gamma[x] is defined by a following formula:

$$\text{Gamma}[x] = D\gamma^{MAX} \cdot (x/D_{IN}^{MAX})^{\gamma_{logic}},$$

said $CP_1$ to $CP_4$ are represented by following formulas, respectively, $$CP_1 = \frac{4Gamma[(D_{IN3} - D_{IN}^{MIN})/2] - Gamma[D_{IN}^{MIN}] - Gamma[D_{IN3}]}{2},$$

$$CP_2 = Gamma[D_{IN2}],$$

$$CP_3 = Gamma[D_{IN3}],$$

$$CP_4 = \frac{Gamma[(D_{IN}^{MAX} - D_{IN2})/2] - Gamma[D_{IN2}] - Gamma[D_{IN}^{MAX}]}{2}.$$

7. A controller driver, comprising:

an area specifying correction point data setting register configured to store a plurality of correction data, each of which is set correspondingly to one of a plurality of display panels;

a correction circuit configured to generate a corrected gray-scale data on a basis of input gray-scale data; and a driving circuit configured to drive a display panel in response to said corrected gray-scale data, the driving circuit being commonly used by said plurality of said display panels, wherein said correction circuit generates said corrected gray-scale data by executing a correction using a polynomial in which said input gray-scale data are used as variables, wherein coefficients of said polynomial are changed in response to an output signal supplied from outside of said correction circuit, wherein said area specifying correction point data setting register stores a plurality of correction data for said plurality of the display panels, and selects a corresponding one of said plurality of correction data based on to which of said plurality of the display panels said input gray-scale data supplied to said correction circuit are displayed, wherein said driving circuit selects a selection gray-scale voltage from said plurality of gray-scale voltage, and drives a signal line of said display panel into said selection gray-scale voltage, wherein said polynomial is a quadratic polynomial with respect to said input gray-scale data, which is set such that a gamma correction, which corresponds to a gamma curve with respect to a second gamma value of $\gamma_{logic}$, is approximately executed, and wherein an entire gamma value of $\gamma_{display}$ is defined by a following formula:

$$\gamma_{display} = \gamma_{drive} \times \gamma_{logic},$$

said $\gamma_{drive}$ is set not to exceed said $\gamma_{display}$.

8. The controller driver according to claim 7, wherein said output signal is supplied from said area specifying correction point data setting register and includes said corresponding one of said plurality of correction data, and wherein coefficients of said polynomial are set by using said corresponding one of said plurality of correction data.

9. The controller driver according to claim 7, wherein coefficients of said polynomial are set by using said corresponding one of said plurality of correction data.

10. The controller driver according to claim 7, wherein said corrected gray-scale data is calculated by using a following formula:

$$D\gamma = \frac{D\gamma^{MIN}(D_{IN3} - D_{IN})^2 + 2CP_1(D_{IN3} - D_{IN})(D_{IN} - D_{IN}^{MIN})}{(D_{IN3})^2} + CP_3(D_{IN} - D_{IN}^{MIN})^2,$$

when said input gray-scale data is in said first range, and said corrected gray-scale data is calculated by using a following formula:

$$D\gamma = \frac{CP_2(D_{IN}^{MAX} - D_{IN})^2 + 2CP_4(D_{IN}^{MAX} - D_{IN})(D_{IN} - D_{IN2})}{(D_{IN}^{MAX} - D_{IN2})^2} + D\gamma^{MAX}(D_{IN} - D_{IN2})^2,$$

when said input gray-scale data is in said second range, wherein said $D\gamma$ is said corrected gray-scale data, said $D_{IN}$ is said input gray-scale data, said $CP_1$ to $CP_4$ are said first to fourth correction data, said $D\gamma^{MIN}$, said $D\gamma^{MAX}$, said $D_{IN2}$ and said $D_{IN3}$ are predetermined parameters.

11. The controller driver according to claim 10, wherein said $D_{IN3}$ is a number expressed by using an exponential of two.

12. The controller driver according to claim 11, wherein said $D_{IN2}$ is defined as a number, of which $(D_{IN}^{MAX}-D_{IN2})$ is a number expressed by using an exponential of two.

13. The controller driver according to claim 11, wherein said $D_{IN2}$ and said $D_{IN3}$ are set to satisfy a following formula:

$$D_{IN}^{MIN}<D_{IN2}<D_{IN}^{Center}<D_{IN3}<D_{IN}^{MAX},$$

wherein Gamma[x] is defined by a following formula:

$$\mathrm{Gamma}[x]=D\gamma^{MAX}\cdot(x/D_{IN}^{MAX})^{\gamma logic},$$

said $CP_1$ to $CP_4$ are represented by following formulas, respectively, $$CP_1=\frac{4Gamma[(D_{IN3}-D_{IN}^{MIN})/2]-Gamma[D_{IN}^{MIN}]-Gamma[D_{IN3}]}{2},$$

$$CP_2=Gamma[D_{IN2}],$$

$$CP_3=Gamma[D_{IN3}],$$

$$CP_4=\frac{Gamma[(D_{IN}^{MAX}-D_{IN2})/2]-Gamma[D_{IN2}]-Gamma[D_{IN}^{MAX}]}{2}.$$

* * * * *